(12) United States Patent
An

(10) Patent No.: US 9,146,440 B2
(45) Date of Patent: Sep. 29, 2015

(54) OPTICAL CONTROLLER CONTAINING DISPENSABLE ELECTROPHORETIC FLUID AND METHOD OF DISPERSING SAME

(71) Applicant: LG Display Co., Ltd., Yeongdeungpo-Gu, Seoul (KR)

(72) Inventor: Hyunjin An, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 368 days.

(21) Appl. No.: 13/860,344

(22) Filed: Apr. 10, 2013

(65) Prior Publication Data

US 2014/0192401 A1    Jul. 10, 2014

(30) Foreign Application Priority Data

Jan. 7, 2013 (KR) .......................... 10-2013-0001623

(51) Int. Cl.
*G02F 1/167* (2006.01)
*G02F 1/1341* (2006.01)

(52) U.S. Cl.
CPC ...... *G02F 1/167* (2013.01); *G02F 2001/13415* (2013.01); *G02F 2001/1672* (2013.01); *G02F 2001/1676* (2013.01)

(58) Field of Classification Search
CPC .................. G02F 1/167; G02F 1/1341; G02F 2001/13415; G02F 2001/1672; G02F 2001/1676; G02F 2001/1678
See application file for complete search history.

(56) References Cited

U.S. PATENT DOCUMENTS

| 2003/0030884 A1 | | 2/2003 | Minami |
| 2006/0214906 A1 | | 9/2006 | Kobayashi et al. |
| 2012/0275013 A1 | * | 11/2012 | Hayashi ........................ 359/296 |

FOREIGN PATENT DOCUMENTS

KR    10-2005-0026251 A    3/2005

OTHER PUBLICATIONS

International Search Report, Apr. 22, 2014.
English Translation of KR 10-2005-0026251 A, Mar. 15, 2005.

* cited by examiner

*Primary Examiner* — Joseph P Martinez
(74) *Attorney, Agent, or Firm* — Novak Druce Connolly Bove + Quigg LLP

(57) ABSTRACT

An optical controller includes: a transparent lower substrate with a first electrode pattern; a transparent upper substrate with a transparent electrode; a plurality of divided regions separated by partitions on the transparent lower substrate; a medium containing charged particles at less than 5 wt % is in the plurality of divided regions and between the first electrode pattern and the transparent electrode; and a seal surrounding the plurality of divided regions and bonded to the first and second substrates.

31 Claims, 31 Drawing Sheets

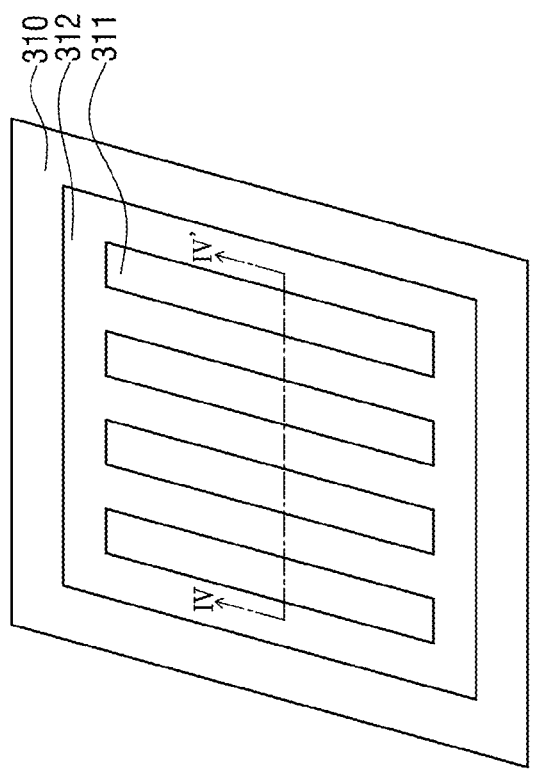
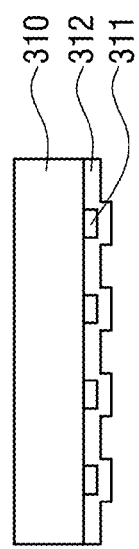
FIG. 22a
FIG. 22b

OPTICAL CONTROLLER CONTAINING DISPENSABLE ELECTROPHORETIC FLUID AND METHOD OF DISPERSING SAME

BACKGROUND OF THE INVENTION

1. Field of the Invention

This application claims the benefit of Korean Patent Application No. 10-2013-0001623, filed on Jan. 7, 2013, which is hereby incorporated by reference as if fully set forth herein. The embodiments of the invention relate to an optical controller, and more particularly, an optical controller containing electrophoretic fluid. Although embodiments of the invention are suitable for a wide scope of applications, it is particularly suitable for an electrophoretic display device having a partition structure.

2. Discussion of the Related Art

In general, an electrophoretic fluid has pigment particles suspended in a clear dielectric fluid or a colored transmissive dielectric fluid. Each of the pigment particles has a permanent charge. An electrophoretic device typically includes the electrophoretic fluid between spaced-apart plate-like electrodes. One of the electrodes is typically transparent. The other electrode may have a smaller width than the transparent electrode and be disposed on a lower substrate. When a voltage is applied across the two electrodes, the pigment particles collect at the electrode of polarity opposite that of the charge on the pigment particles. The pigment particles are typically collected at the electrode with a smaller width or at the bottom of a shallow reservoir. Thus, a color of light passing through the electrophoretic device will be the color of the dielectric fluid through which the light passes. A subsequent reversal of the voltage polarity on the electrodes causes the particles to disperse back into the dielectric fluid such that the color is like that of the pigment particles plate.

An electrophoretic display is flat panel display device that can include thousands of electrophoretic devices. Each of the electrophoretic devices should have the same amount of pigment particles and dielectric fluid such that each of the electrophoretic devices have the same performance in response to voltages on the electrodes of the electrophoretic devices. Because the pigment particles are in a fluid, the pigment particles may undesirably move within a display due to gravity such that some electrophoretic devices have significantly more pigment particles than other electrophoretic devices in the display. To prevent undesired movement, such as sedimentation, of the pigment particles within a display, partitions divide the display into cells containing electrophoretic fluid for one or more electrophoretic devices. However, there are difficulties in forming electrophoretic displays with partition structures.

FIG. 1 shows a flow chart for a method of forming an electrophoretic display by continuously dispersing electrophoretic fluid and sealant according to the prior art. As shown in FIG. 1, a method 1 of forming an electrophoretic display according to the prior art includes forming a lower electrode on a lower substrate 2. Then, the method 1 continues by forming a plurality of divided regions on the lower substrate 3. Subsequently, an electrophoretic fluid is continuously dispensed into the divided regions 4.

FIG. 2a illustrates an apparatus and method for continuously dispersing electrophoretic fluid prior to bonding substrates for an electrophoretic display according to the prior art. As shown in FIG. 2a, lower electrodes 11 are formed on a lower substrate 10. The lower substrate 10 is divided into regions by partitions 12. An electrophoretic fluid dispenser 13 moves in a direction D and continuously dispenses electrophoretic fluid 14 onto the lower substrate between the partitions 12 and onto the partitions 12.

As shown in FIG. 1, the method 1 includes continuously dispensing a sealing layer onto electrophoretic fluid 5. Then, the sealing layer is cured on the electrophoretic fluid 6. The curing can be done using ultraviolet light.

FIG. 2b illustrates an apparatus and method for continuously dispersing sealant prior to bonding substrates for an electrophoretic display according to the prior art. As shown in FIG. 2b, a sealing dispenser 15 moves in a direction D and continuously dispenses a sealing layer 16 onto electrophoretic fluid 14. The sealing layer 16 is on the electrophoretic fluid 14 between the partitions 12 as well as the electrophoretic fluid 14 on top of the partitions 12. The sealing layer 16 seals the electrophoretic fluid 14 between the partitions 12 and prevents migration of both the pigment particles and dielectric fluid of the electrophoretic fluid 14.

As shown in FIG. 1, the method 1 includes forming an upper electrode on an upper substrate 7. The upper electrode can be a sputter deposited indium tin oxide. Then, the method 1 includes forming an adhesive layer on the upper substrate 8. The adhesive layer can be an applied double-sided adhesive or a sprayed on adhesive. After the upper and lower substrates are formed, the method 1 includes positioning the adhesive layer of the upper substrate onto the cured sealing layer of the lower substrate to bond the upper and lower substrates together 9.

FIG. 2c illustrates a cross-sectional view of bonding substrates for an electrophoretic display according to the prior art. As shown in FIG. 2c, an upper electrode 18 is formed on an upper substrate 17. The upper substrate 18 is transparent. An adhesive layer 19 is provided on the upper electrode 18. The adhesive layer 19 is positioned to be lowered onto the cured sealing layer 16 to bond the upper substrate 17 and lower substrate 10 together using the adhesive layer 19.

FIG. 2d illustrates a cross-sectional view of an electrophoretic display according to the prior art. As shown in FIG. 2d, the divided regions between the partitions 12 an electrophoretic display according to the prior art may not be uniformly filled with electrophoretic fluid 14. Non-uniformity in filling along with varying sizes of air gaps between the partitions can cause variations in performance amongst an array of pixels in an electrophoretic display device. The ultraviolet curing of sealant on the electrophoretic fluid can cause a chemical reaction between the sealing layer and the pigments particles, which randomly degrades the individual performance characteristics of pigment particles for electrophoresis amongst the array of pixels in an electrophoretic display device. Further, the presence of the sealing layer together with the electrophoretic fluid on top of the partitions can cause the appearance of point defects on the display due varying thicknesses of combinations of sealing layer together with the electrophoretic fluid.

SUMMARY OF THE INVENTION

Accordingly, embodiments of the invention are directed to a dispensable electrophoretic fluid and method of dispersing same that substantially obviates one or more of the problems due to limitations and disadvantages of the related art.

An object of embodiments of the invention is to evenly disperse an electrophoretic fluid throughout the divided regions of an optical controller.

Another object of embodiments of the invention is to prevent sealant from mixing with the electrophoretic fluid of an optical controller.

Another object of embodiments of the invention is to remove air from the divided regions of an optical controller.

Another object of embodiments of the invention is to fill the divided regions of an optical controller with electrophoretic fluid.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, an optical controller, includes: a transparent lower substrate with a first electrode pattern; a transparent upper substrate with a transparent electrode; a plurality of divided regions separated by partitions on the transparent lower substrate; a medium containing charged particles at less than 5 wt % within the plurality of divided regions and between the first electrode pattern and the transparent electrode; and a seal surrounding the plurality of divided regions and bonded to the first and second substrates.

In another aspect, an optical controller includes: a lower substrate with a first electrode pattern; an upper substrate with a second electrode pattern; a plurality of divided regions separated by partitions on the lower substrate; and a medium positioned within the seal structure and between the first electrode pattern and the second electrode pattern, the medium having a vapor pressure of less than 40 Pa and containing charged particles of substantially a first polarity.

In yet another aspect, an a method of making an optical controller includes: forming a first electrode on a first substrate; forming a plurality of divided regions separated by partitions on the first substrate; dispensing an electrophoretic fluid on the first substrate in which the fluid contains charged particles at less than 5 wt %; forming a second electrode on a second substrate; positioning the second substrate on the first substrate in a chamber; and evacuating the chamber so that the first and second substrates are bonded to each other.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

FIGS. 22a and 22b respectively illustrate a perspective view and a side view along IV-IV' of patterned row electrodes on an upper substrate according to an exemplary embodiment of the invention.

DETAILED DESCRIPTION OF THE PREFERRED EMBODIMENTS

Figure 1:
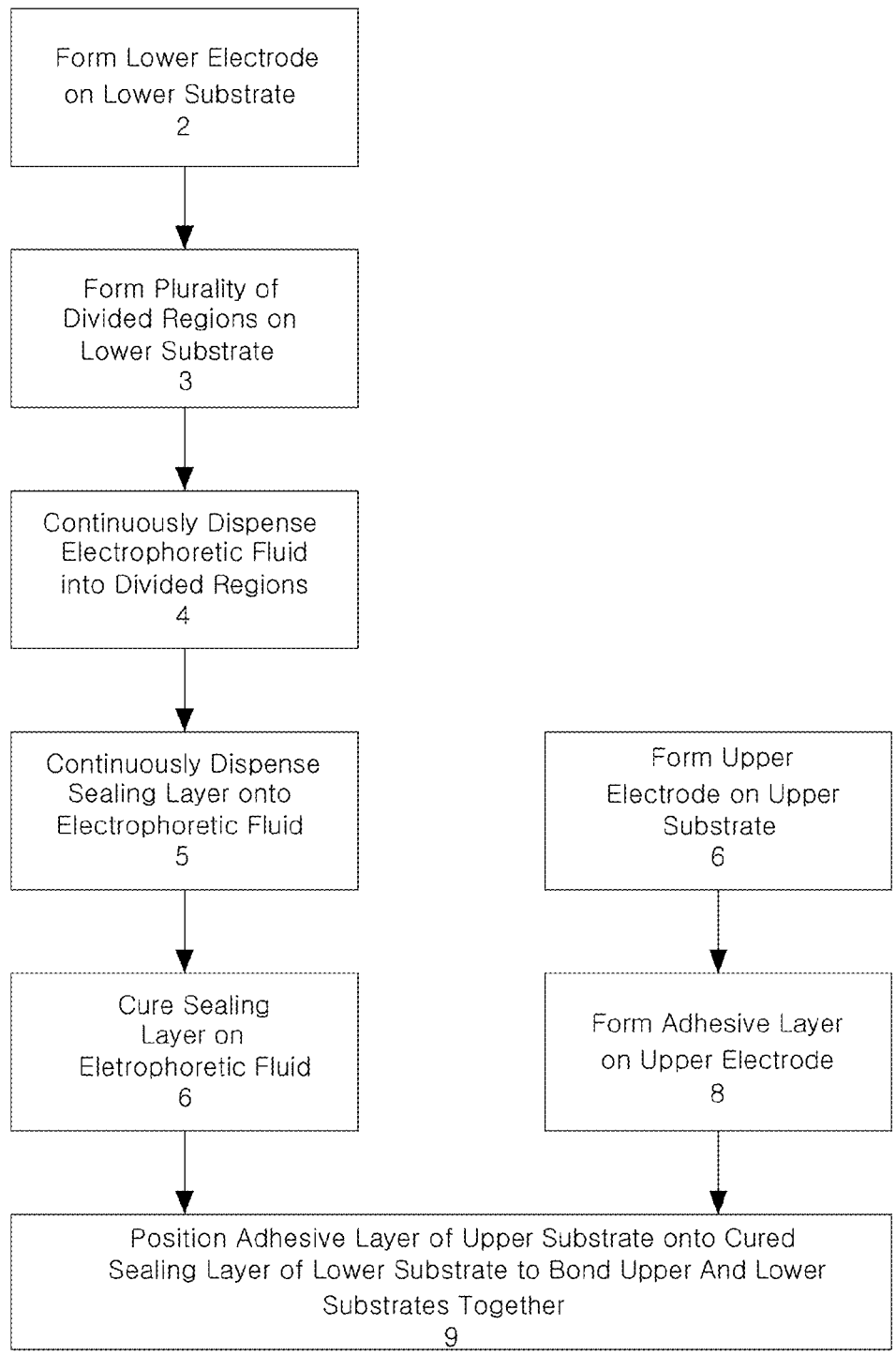
FIG. 1 shows a flow chart for a method of forming an electrophoretic display by continuously dispersing electrophoretic fluid and sealant according to the prior art.
Figure 2A:
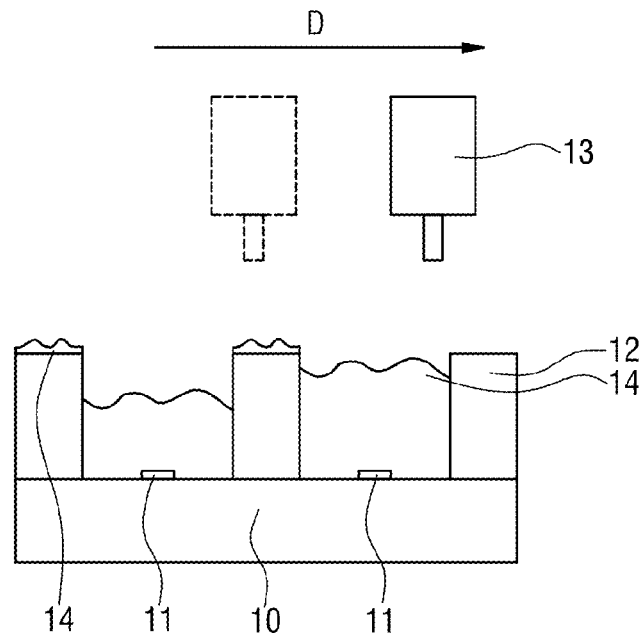
FIG. 2a illustrates an apparatus and method for continuously dispersing electrophoretic fluid prior to bonding substrates for an electrophoretic display according to the prior art.
Figure 2B:
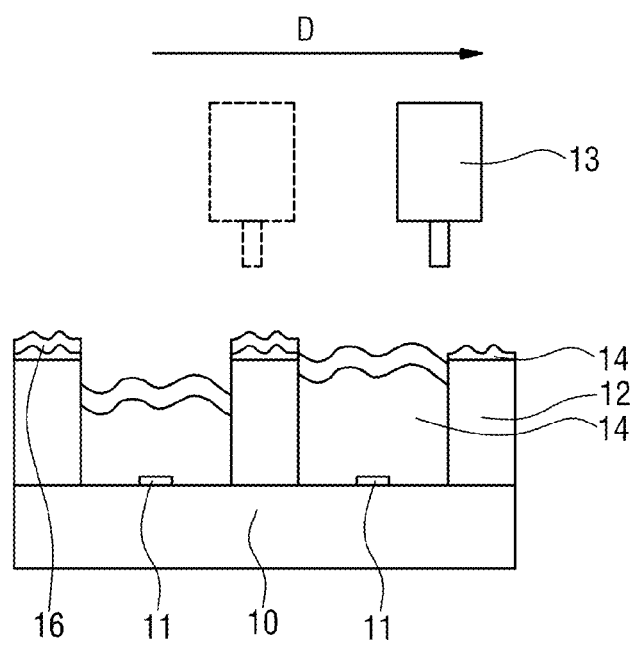
FIG. 2b illustrates an apparatus and method for continuously dispersing sealant prior to bonding substrates for an electrophoretic display according to the prior art.
Figure 2C:
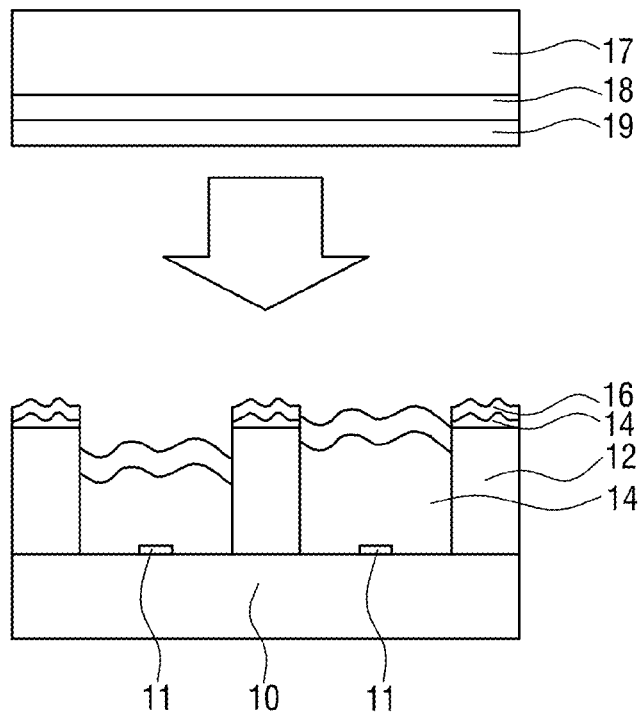
FIG. 2c illustrates a cross-sectional view of bonding substrates for an electrophoretic display according to the prior art.
Figure 2D:
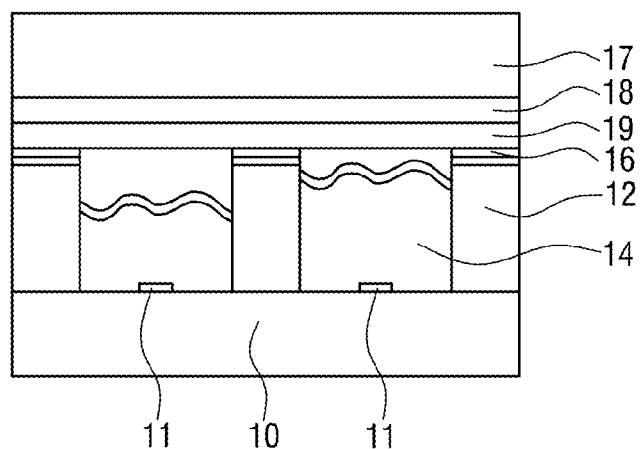
FIG. 2d illustrates a cross-sectional view of an electrophoretic display according to the prior art.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 3:
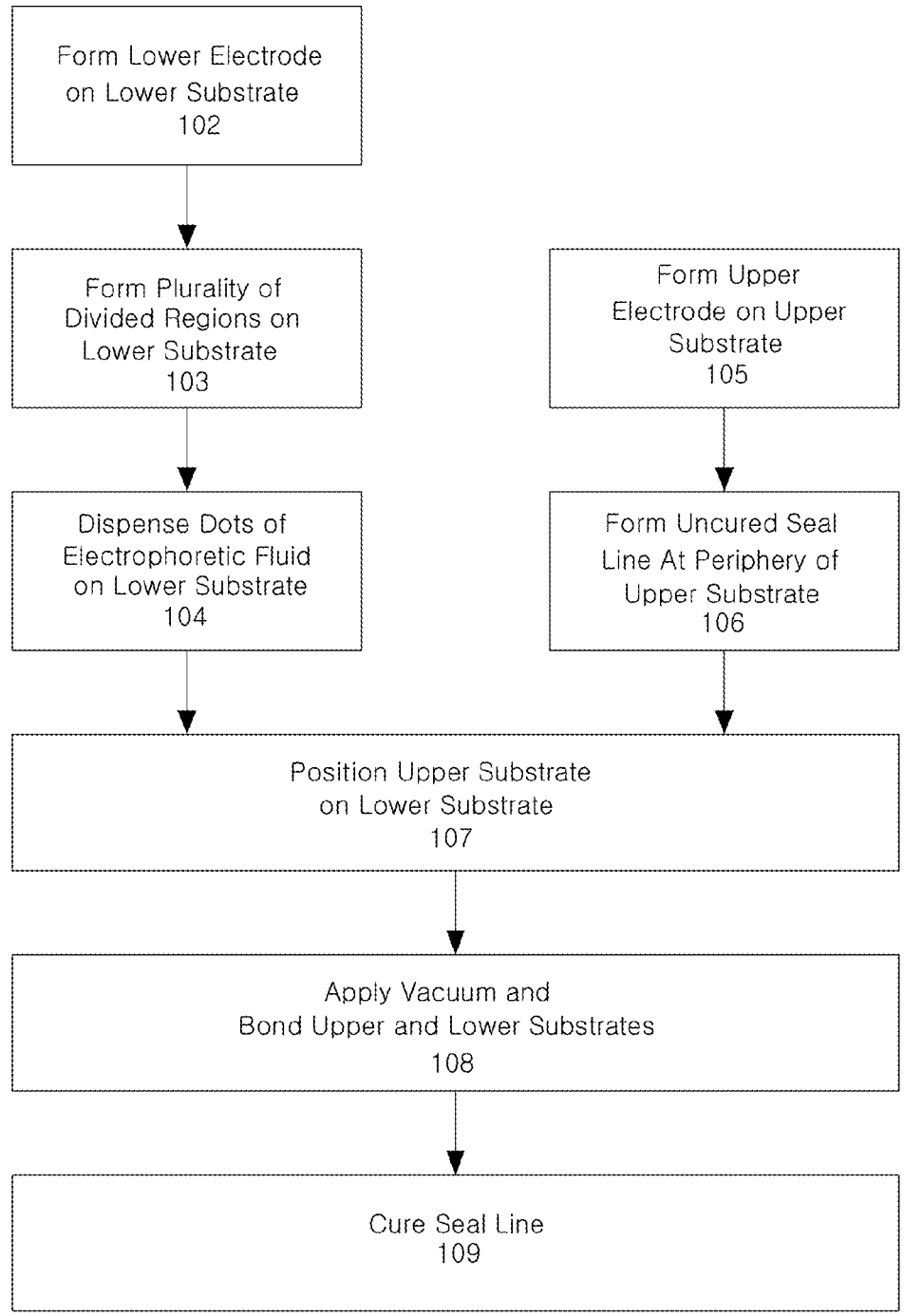
FIG. 3 shows a flow chart for a method of forming an optical shutter by dispensing electrophoretic fluid dots according to an exemplary embodiment of the invention.

FIG. 3 shows a flow chart for a method of forming an optical shutter by dispensing electrophoretic fluid dots according to an exemplary embodiment of the invention. As shown in FIG. 3, a method 100 of forming an optical shutter according to exemplary embodiments of the invention includes forming a lower electrode on a lower substrate 102. The optical shutter in embodiments of the invention can be used as an active blocking layer, optical shutter, electro-optical shutter device, active optical shutter, optical controller, optical control device, and smart window. In the event of use as a smart window in which the smart window is installed in a place that makes it easily exposed to impact from an outside source, such as on a building's exterior wall or car window, the optical control device can be configured to easily absorb impact or have strong tolerance to impact.

Figure 4A:
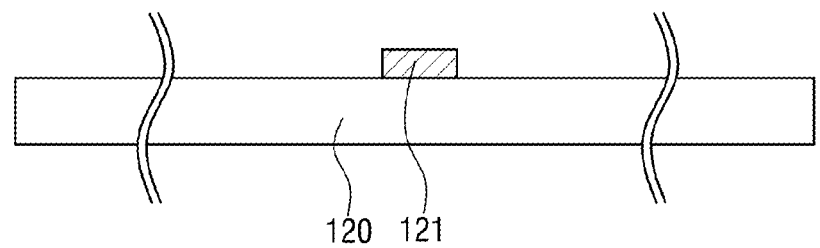
FIGS. 4a and 4b illustrate a cross-sectional views of forming a patterned electrode in a divided region on a lower substrate according to an exemplary embodiment of the invention.

The method 100 shown in FIG. 3 continues by forming a plurality of divided regions on the lower substrate 103. Subsequently, an electrophoretic fluid dots is dispensed into the divided regions on the lower substrate 104. The electrophoretic fluid has pigment particles suspended in a clear dielectric fluid or a colored transmissive dielectric fluid. Each of the pigment particles has a permanent charge. FIG. 4a illustrate a cross-sectional view of a patterned electrode on a lower substrate according to an exemplary embodiment of the invention. As shown in FIG. 4a, a transparent substrate 120 has an electrode pattern 121. Although a single electrode is show in FIG. 4a, the pattern of electrodes on the substrate 120 can include many electrodes of different shapes and sizes that are either interconnected or separate from one another. The electrode pattern 121 is connected to a switching device for an active matrix optical controller or an address electrode for a passive matrix optical controller.

Figure 4B:
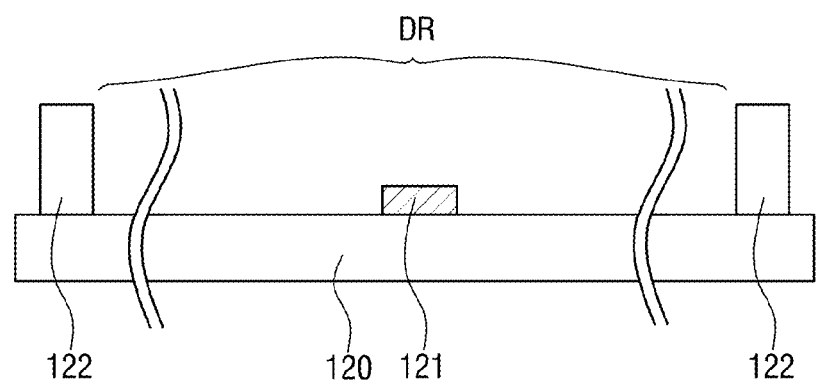

As shown in FIG. 3, the method 100 of forming an optical shutter according to exemplary embodiments of the invention includes forming a plurality of divided regions on the lower substrate 103. FIG. 4b illustrate a cross-sectional view of a divided region on a lower substrate according to an exemplary embodiment of the invention. As shown in FIG. 4b, partitions 122 are positioned across the lower substrate 120. A portion of the substrate directly between two adjacent partitions 122 is a divided region DR. The length or span of divided region DR can be within a range of 200 to 600 micrometers. A divided region DR can include one, two, three or more pixels in a display device. The partitions 122 can be formed of polymer or other insulating materials that can be patterned.

Figure 5:
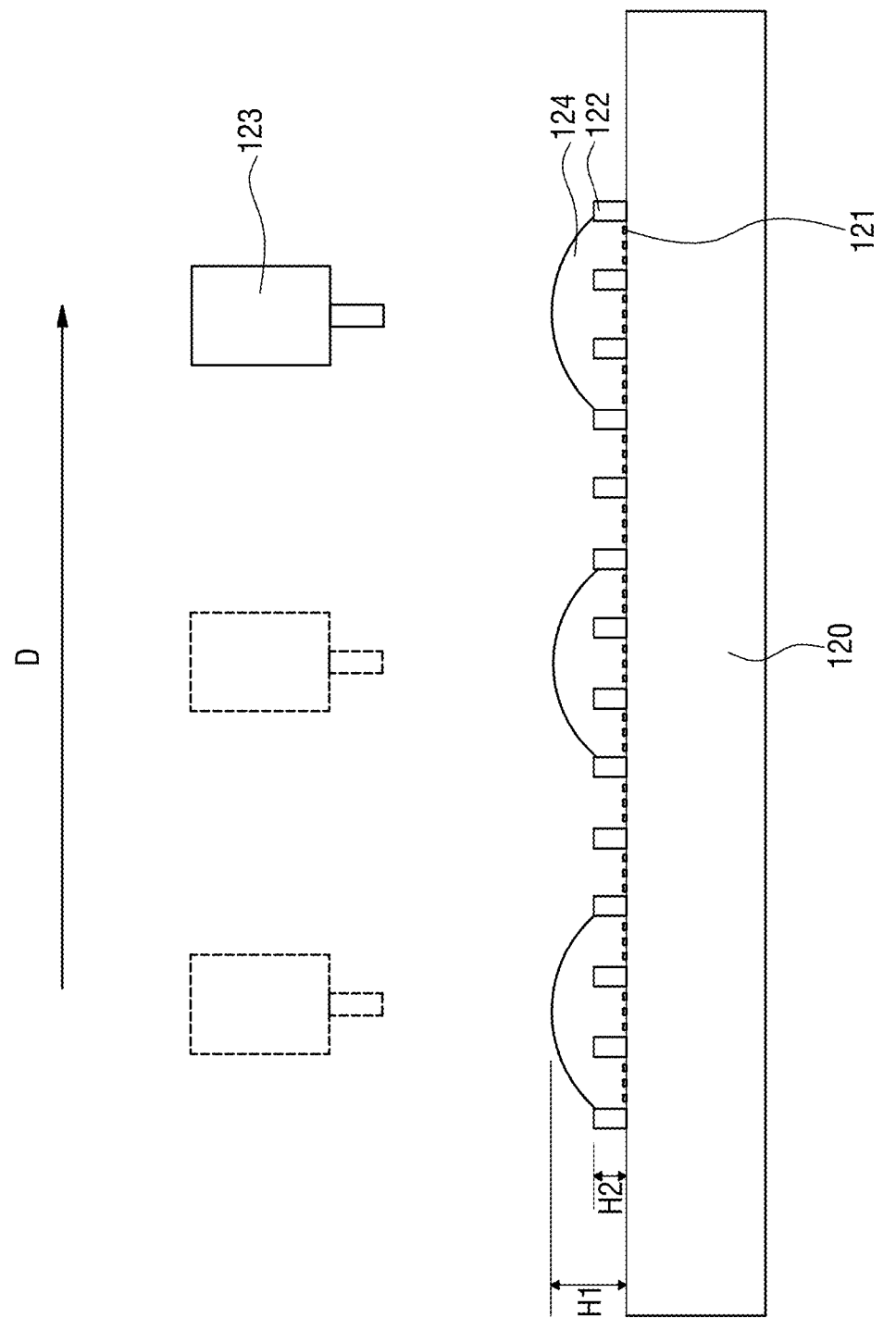
FIG. 5 illustrates an apparatus for dispensing electrophoretic fluid dots at intervals into some of the divided regions according to an exemplary embodiment of the invention.

As shown in FIG. 3, the method 100 of forming an optical shutter according to exemplary embodiments of the invention includes dispensing dots of electrophoretic fluid on the lower substrate 104. FIG. 5 illustrates an apparatus for dispensing electrophoretic fluid dots at intervals into some of the divided regions according to an exemplary embodiment of the invention. As shown in FIG. 5, An electrophoretic fluid dispenser 123 moves in a direction D and drops dots of electrophoretic fluid 124 onto the lower substrate 120 between the partitions 122 and onto the partitions 122. The dots of electrophoretic fluid 124 are not between each of the partitions 122 but rather the dots are distributed across the lower substrate 120 at substantially regular intervals. Each dot of electrophoretic fluid 124 can extend across several partitions 122 and have an overall height H1 that is larger than the height H2 of the partitions.

Figure 6:
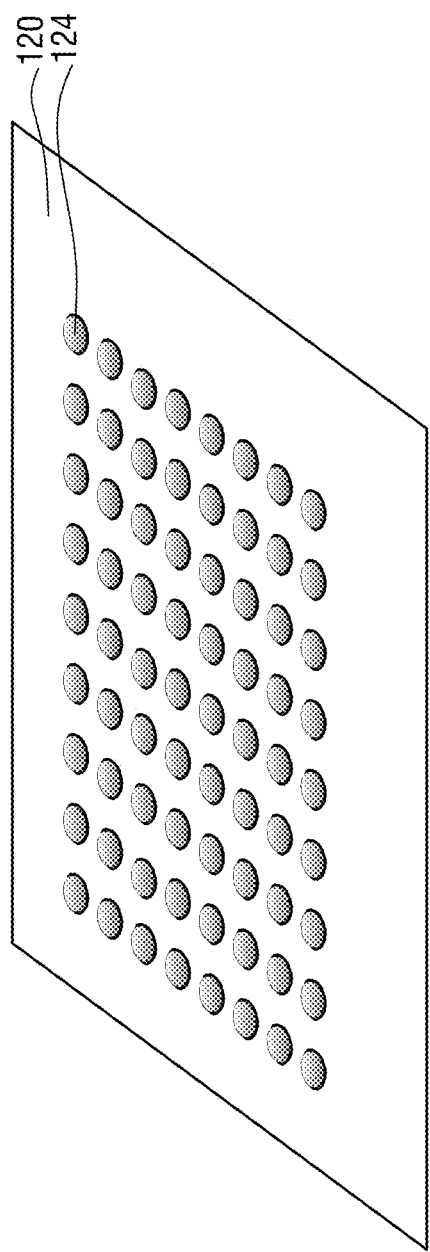
FIG. 6 illustrates electrophoretic fluid dots on a lower substrate according to an exemplary embodiment of the invention.

FIG. 6 illustrates electrophoretic fluid dots on a lower substrate according to an exemplary embodiment of the invention. As shown in FIG. 6, the dots of electrophoretic fluid 124 can be distributed in matrix. The electrophoretic fluid should have a viscosity of less than 100 cp. The vapor pressure of the electrophoretic fluid can be within a range of 100 Pa to 0.01 Pa but should be below 40 Pa. Each dot of electrophoretic fluid 124 should have about the same weight percent of pigment particles and can be in a range of 1 wt. % to 5 wt. %. Each dot of electrophoretic fluid 124 should have about the same mass and can be in a range of 0.1 mg to 100 mg.

Figure 7A:
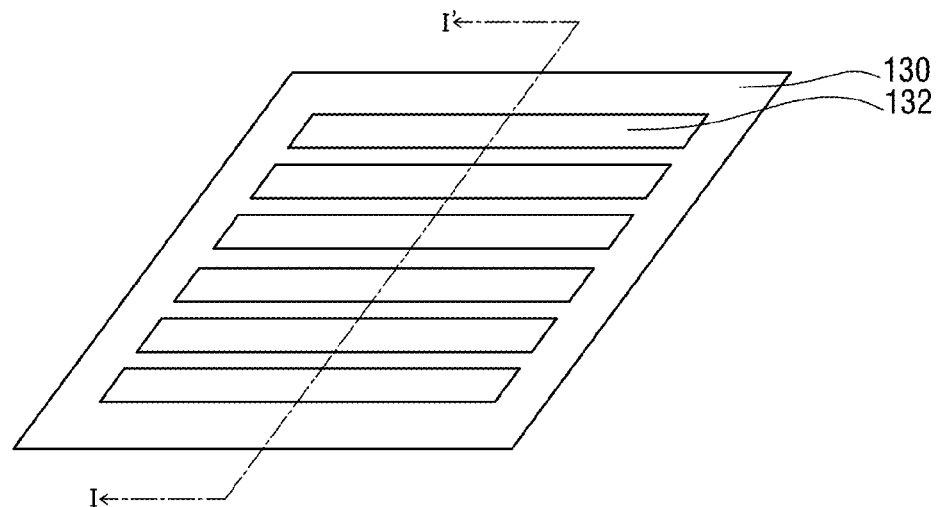
FIGS. 7a and 7b respectively illustrate a perspective view and a side view along I-I' of row electrodes on an upper substrate according to an exemplary embodiment of the invention.
Figure 7B:
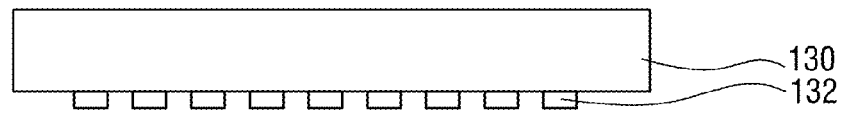

As shown in FIG. 3, the method 100 includes forming an upper electrode on an upper substrate 105. The upper electrode can be a sputter deposited indium tin oxide, which is then patterned. FIGS. 7a and 7b respectively illustrate a perspective view and a side view along I-I' of row electrodes on an upper substrate according to an exemplary embodiment of the invention. The row electrodes 132 are provided on a transparent upper substrate 130 made of glass or a polymer. The pattern of the row electrodes 132 have a predetermined spacing for a correspondence with patterned electrodes on a lower substrate that will subsequently be attached to the upper substrate 130.

Figure 8A:
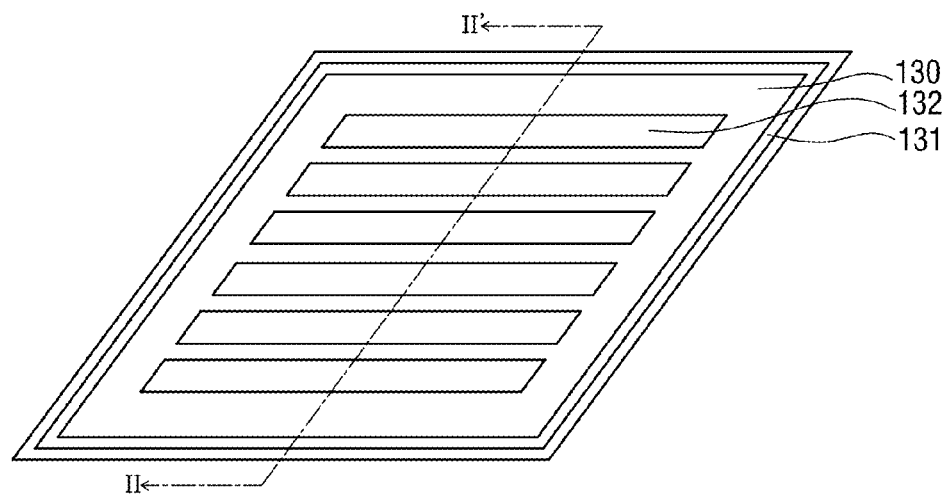
FIGS. 8a and 8b respectively illustrate a perspective view and a side view along II-II' of an uncured seal line on a periphery of an upper substrate according to an exemplary embodiment of the invention.
Figure 8B:
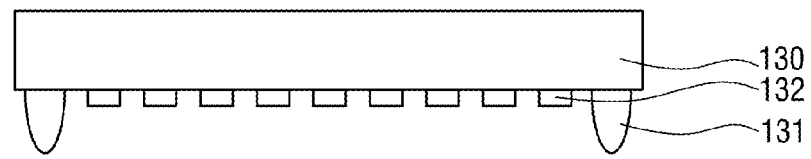

As shown in FIG. 3, the method 100 includes forming an uncured seal line at a periphery of the upper substrate 106. The material for the uncured seal line can be a viscous sealant that is dispensed about the periphery of the substrate. FIGS. 8a and 8b respectively illustrate a perspective view and a side view along II-II' of an uncured seal line on a periphery of an upper substrate according to an exemplary embodiment of the invention. The uncured seal line 131 is positioned on the upper substrate just outside of the electrodes 132. The uncured seal line 131 is pliable and tacky.

Figure 9:
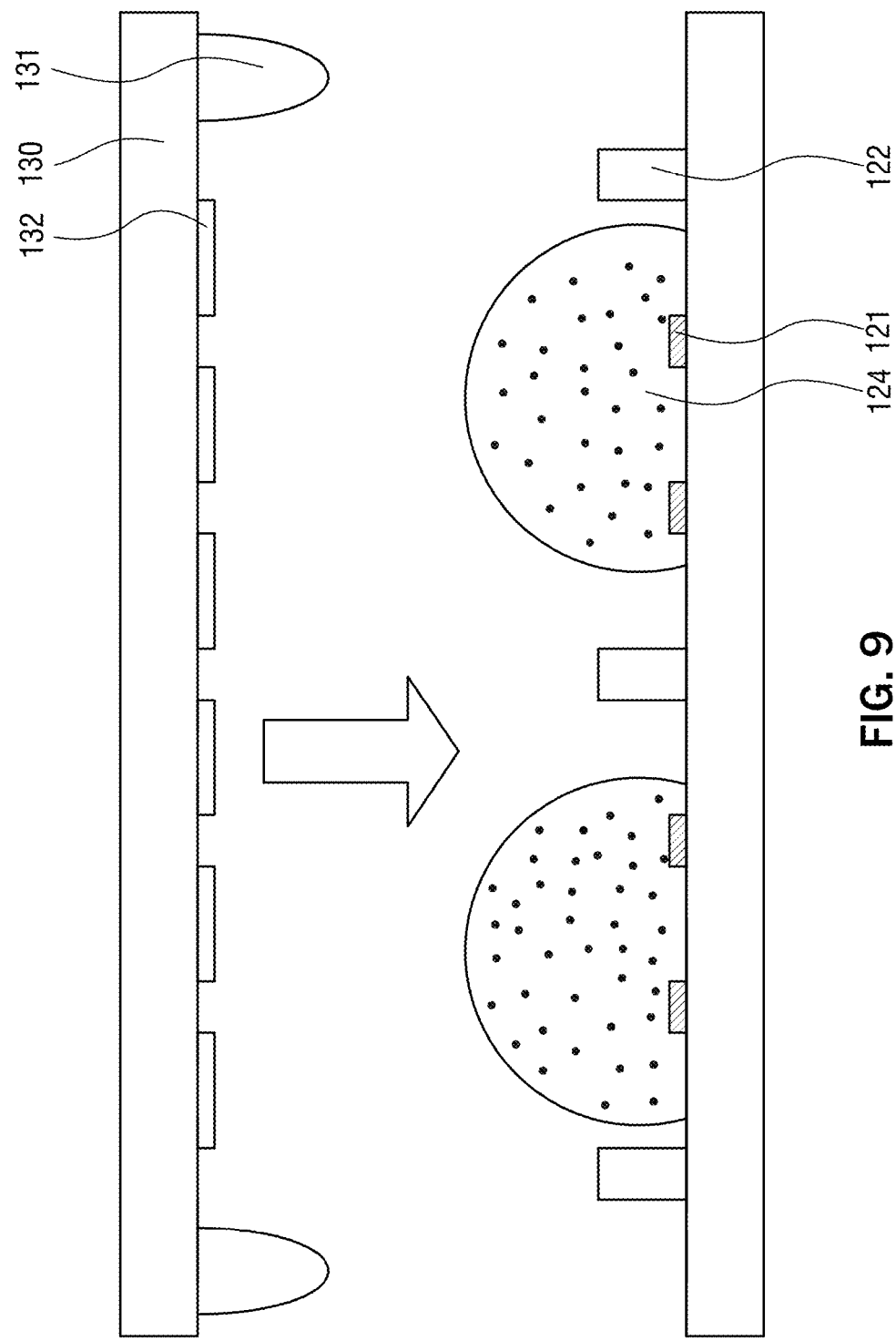
FIG. 9 illustrates positioning an upper substrate with respect to a lower substrate according to an exemplary embodiment of the invention.
Figure 10:
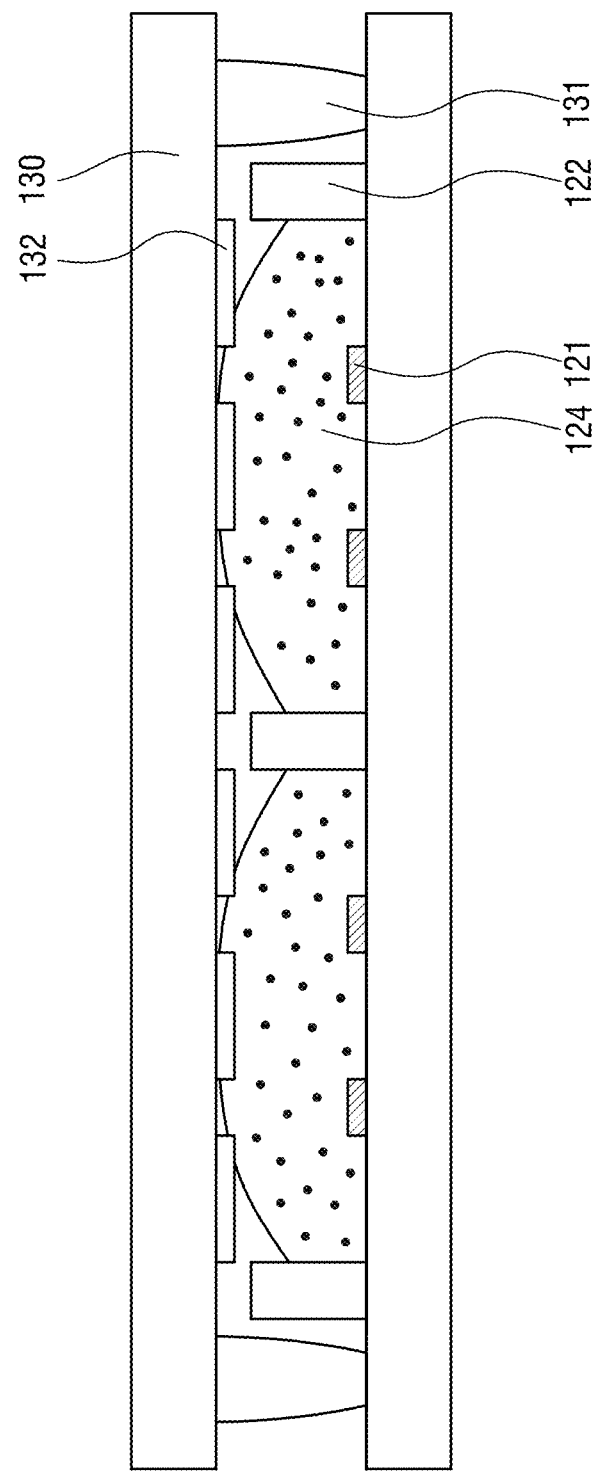
FIG. 10 illustrates an uncured seal line of an upper substrate on a lower substrate according to an exemplary embodiment of the invention.

As shown in FIG. 3, the method 100 includes positioning the uncured seal line of the upper substrate onto the lower substrate 107. FIG. 9 illustrates positioning an upper substrate with respect to a lower substrate according to an exemplary embodiment of the invention. As shown in FIG. 9, the upper substrate 130 be positioned over the lower substrate 120 and lower onto the lower substrate 120 having dots of electrophoretic fluid 124. FIG. 10 illustrates an uncured seal line of an upper substrate on a lower substrate according to an exemplary embodiment of the invention. As shown in FIG. 10, the uncured seal line 131 of the upper substrate 130 compress as the uncured seal line 131 is positioned on the lower substrate 120. Further, the dots of electrophoretic fluid 124 spread out as slightly disperse as the upper substrate 130 is positioned on the lower substrate 120

Figure 11:
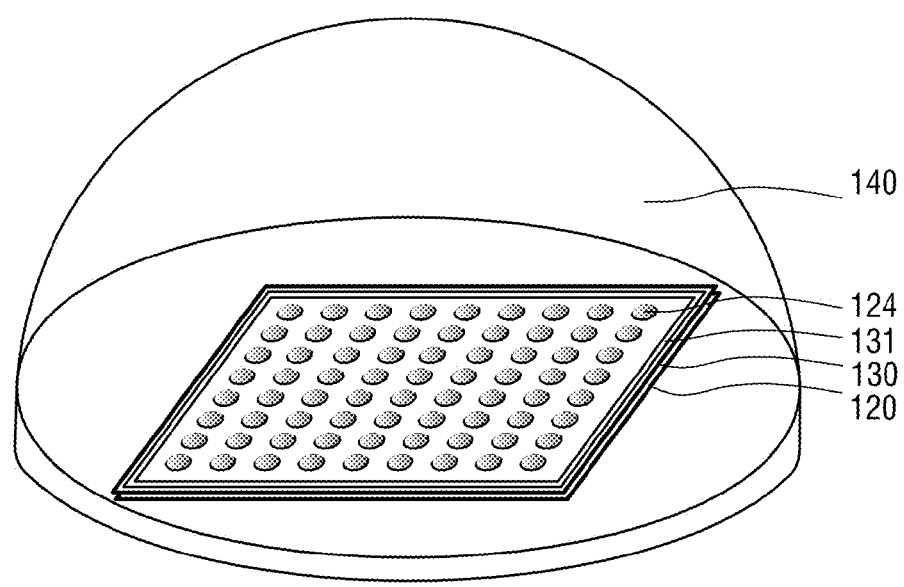
FIG. 11 illustrates upper and lower substrates with a seal line surrounding the electrophoretic fluid dots positioned within a vacuum chamber according to an exemplary embodiment of the invention.
Figure 12:
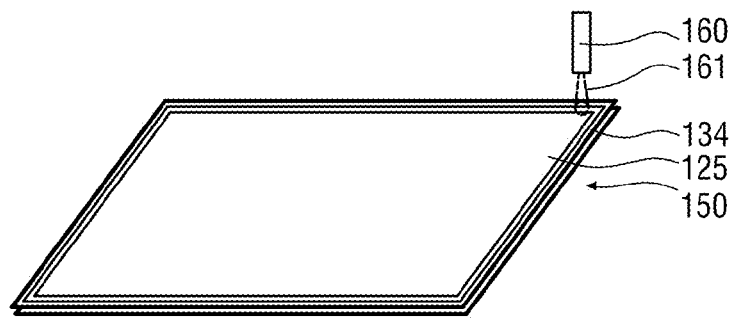
FIG. 12 illustrates dispersed electrophoretic fluid between the upper and lower substrates with the surrounding seal pattern being cured with light according to an exemplary embodiment of the invention.

As shown in FIG. 3, the method 100 includes applying a vacuum to remove air in a chamber. Applying a vacuum to the chamber or evacuating a chamber results in the chamber having significantly less pressure than atmospheric pressure. FIG. 11 illustrates lower and upper substrates with a seal line surrounding the electrophoretic fluid dots positioned within a vacuum chamber according to an exemplary embodiment of the invention. As shown in FIG. 11, the lower substrate 120 and upper substrate 130 with an uncured seal line 131 surrounding the dots of electrophoretic fluid 124 are positioned within a chamber 140. A vacuum is applied to remove air from within the chamber and to bring the tops of the partitions into contact with a surface of the upper substrate such that the divided regions are isolated from one another. At a same time, the upper substrate and the lower substrate are bonded and the dots of electrophoretic fluid 124 are dispersed between the upper and the lower substrates As shown in FIG. 3, the method 100 includes curing seal line to bond the upper and lower substrates 109. FIG. 12 illustrates sealing the upper and lower substrates together by having the surrounding seal line being cured with light according to an exemplary embodiment of the invention. As shown in FIG. 12, a cured seal line 134 bonds the upper and lower substrates together to form a panel 150. A UV laser 160 can be positioned to focus UV laser light 161 directly on the seal line such that the upper and lower substrate are sealed together to prevent the penetration of air or moisture between the upper and lower substrates.

Figure 13:
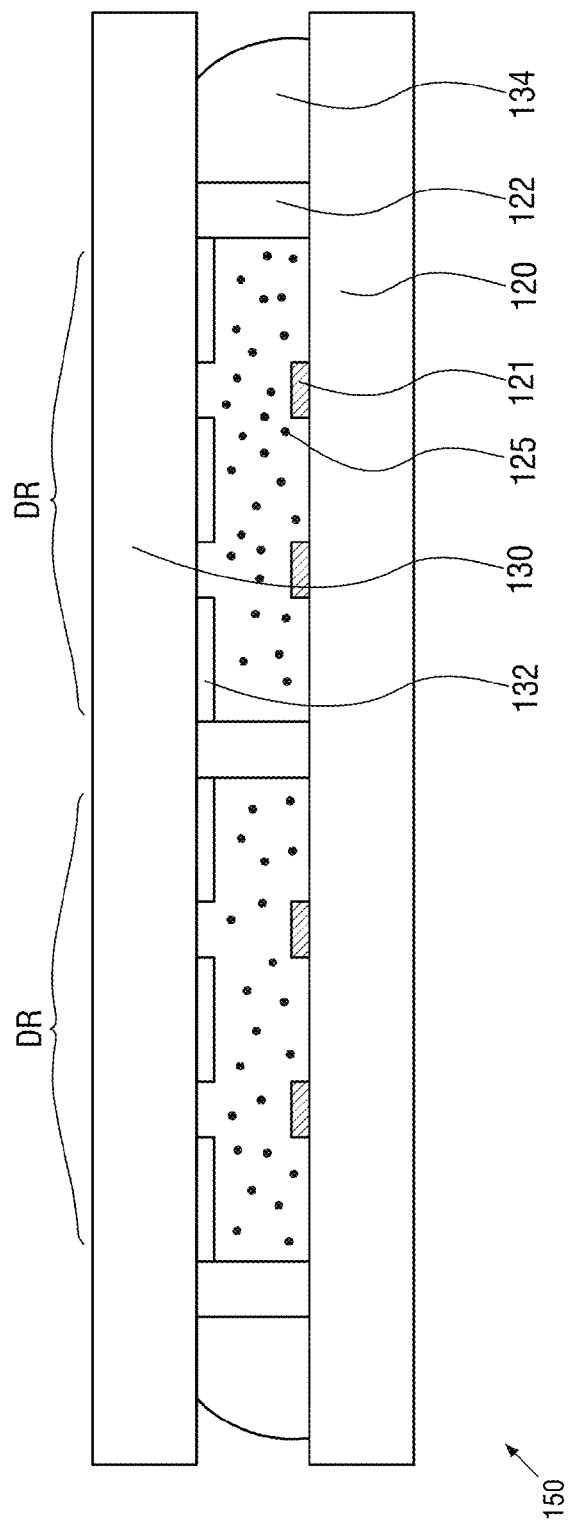
FIG. 13 illustrates a cross-sectional view of an optical shutter according to an exemplary embodiment of the invention.

FIG. 13 illustrates a cross-sectional view of an optical shutter according to an exemplary embodiment of the invention. The panel 150, shown in FIG. 13, has divided regions DR between the partitions 122. Each of the divided regions DR are filled with electrophoretic fluid containing pigment particles 125 between the upper substrate 130 and the lower substrate 120. The cured seal line 134 of the panel 150 seals in the electrophoretic fluid containing pigment particles 125 and is located just beyond the outer partitions 122. The upper electrodes 132 of the upper substrate 130 are offset from the lower electrodes 121 of the lower substrate 120.

A driving implementation for the embodiment shown in FIG. 13 of an optical shutter is discussed below. The pigment particles 125 dispersed in the electrophoretic fluid have a negative charge in this example, but there are also instances where the pigment particles have positive charges. The upper electrodes 132 on the upper substrate 130 and the lower electrodes 121 on the lower substrate 120 may initially be at a reference voltage, 0V, or a ground state.

A positive voltage supplied to the upper electrodes 132 on the upper substrate 130 attracts the positively-charged particles. Depending on the strength of the electric field due to the positive voltage on the upper electrodes 132, the pigment particles 125 may move to the upper substrate 130 to cover the three sides of the upper electrodes 132. Light coming through from the lower substrate 120 is absorbed by the pigment particles 125 on the upper electrodes 132. Further, depending on the concentration of the electric field due to the positive voltage on the upper electrodes 132 and the separation distance of the upper electrodes 132, the pigment particles 125 may also be removed from the area between the upper electrodes 132. However, light can not pass through the area not containing pigment particles 125 between the upper electrodes 132 because the lower electrodes 121 reflect light coming through from the lower substrate 120. Accordingly, if the pigment particles 125 cover the three sides of the electrodes 132, light coming through from the lower substrate 120 is absorbed by the pigment particles 125 on the upper electrodes 132 or reflected by the lower electrodes 121 such that all of the light coming through from the lower substrate 120 is either absorbed or reflected. In this case, the color black can be visible at the upper part of the optical shutter shown in FIG. 13. Thus, depending on the applied voltage, the optical shutter's condition can be placed in a closed mode (i.e. light blocking mode or closed light valve mode) by the pigment particles 125 covering the upper electrodes 132 to absorb light.

A positive voltage may be provided on the lower electrodes 121 of the lower substrate 120 while the upper electrodes 132 on the upper substrate 130 are at a reference voltage, 0V, or a ground state. Depending on the strength of the electric field due to the positive voltage on the lower electrodes 121, the pigment particles 125 can move to the lower substrate 120 to cover the three sides of the lower electrodes 121. Light coming through from the lower substrate 120 passes between the lower electrodes 132, and through each of the electrophoretic fluid, the upper electrodes 132 and the upper substrate 130 of the optical shutter shown in FIG. 13. By positioning the pigment particles 125 on the lower electrodes 132 due to the applied voltages as stated above, the optical shutter can be put into a see through mode or transparent mode.

Figure 14A:
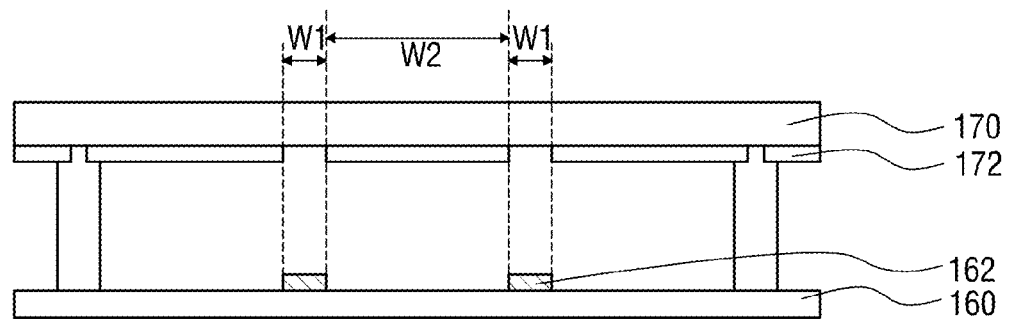
FIGS. 14a-14d illustrate exemplary embodiments of offset positioning of the patterned electrodes on the upper substrate to the patterned electrodes on the lower substrate.

FIGS. 14a-14d illustrate exemplary embodiments of offset positioning of the patterned electrodes on the upper substrate to the patterned electrodes on the lower substrate. FIG. 14a shows patterned upper electrodes 172 on the upper substrate 170 and patterned lower electrodes 162 on the lower substrate 160 having a directly offset relationship like the electrodes shown in FIG. 13. The lower electrodes 162 on the lower substrate 160 have a width W1 that is the same as the spacing between the upper electrodes 172 on the upper substrate 170. Further, the lower electrodes 162 on the lower substrate 160 have a spacing that is the same as the width W2 of the upper electrodes 172 on the upper substrate 170. The density of the electric field between the upper electrodes 172 and the lower electrodes 162 can be controlled by the offset relationship between the upper electrodes 172 and the lower electrodes 162.

Figure 14B:
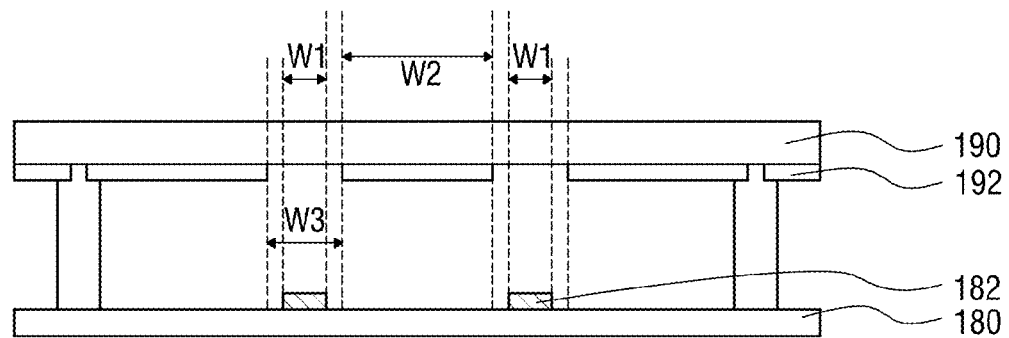

FIG. 14b shows patterned upper electrodes 192 on the upper substrate 190 and patterned lower electrodes 182 on the lower substrate 180 having a spaced-apart offset relationship. The lower electrodes 182 on the lower substrate 180 have a width W1 that is smaller than a spacing between the upper electrodes 192 on the upper substrate 190 having width W3. Further, the lower electrodes 182 on the lower substrate 180 have a spacing that is greater than the width W2 of the upper electrodes 192 on the lower substrate 190. The density of electric field between the upper electrodes 192 and the lower electrodes 182 is toward the sides of the upper electrodes 192 and the lower electrodes 182 compared to the directly offset relationship shown in FIG. 14a.

Figure 14C:
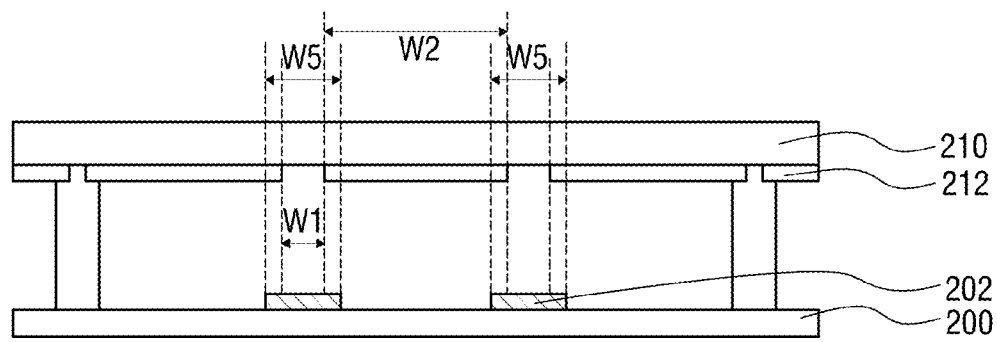

FIG. 14c shows patterned upper electrodes 212 on the upper substrate 210 and patterned lower electrodes 202 on the lower substrate 200 having an overlapping offset relationship. The lower electrodes 202 on the lower substrate 200 have a width W5 that is greater than a spacing between the upper electrodes 212 on the upper substrate 210 having width W1. Further, the lower electrodes 202 on the lower substrate 200 have a spacing that is smaller than the width W2 of the upper electrodes 212 on the upper substrate 210. The density of the electric field between the upper electrodes 212 and the lower electrodes 202 is increased directly between the overlapping upper electrodes 212 and the lower electrodes 202 compared to the spaced-apart offset relationship shown in FIG. 14b.

Figure 14D:
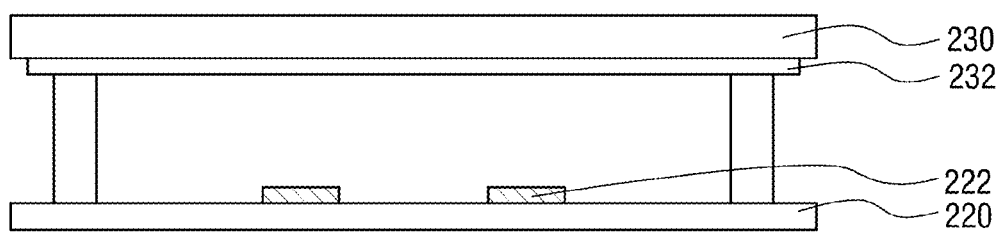

FIG. 14d shows unpatterned upper electrode 232 on the upper substrate 230 and patterned lower electrodes 222 on the lower substrate 220 having a non-offset relationship. The lower electrodes 222 on the lower substrate 220 are completely overlapped by the upper electrode 232 on the upper substrate 230. The lower electrodes 222 on the lower substrate 220 are spaced apart on the lower substrate 220. The density of the electric field directly between the upper electrode 232 and the lower electrodes 222 is higher compared to the overlapping offset relationship shown in FIG. 14c.

Figure 15A:
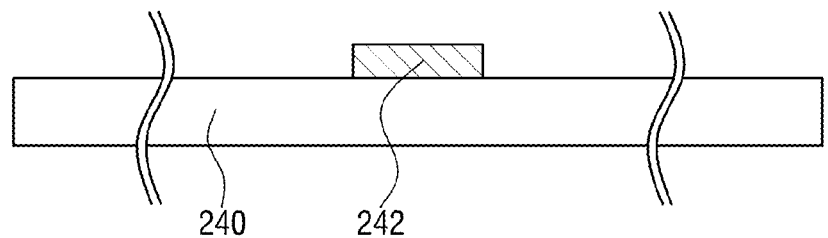
FIGS. 15a-15d illustrate cross-sectional views of forming a patterned and insulated electrode on a lower substrate in a divided region according to an exemplary embodiment of the invention.
Figure 15B:
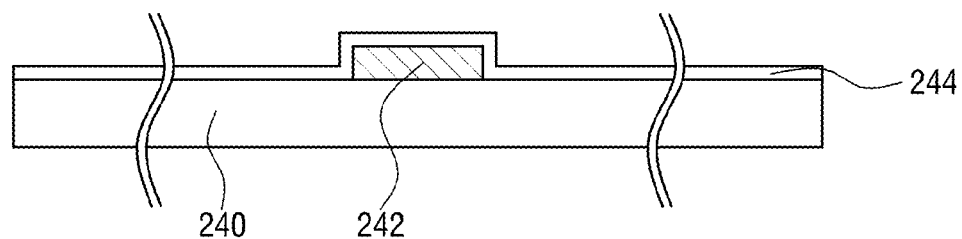
Figure 15C:
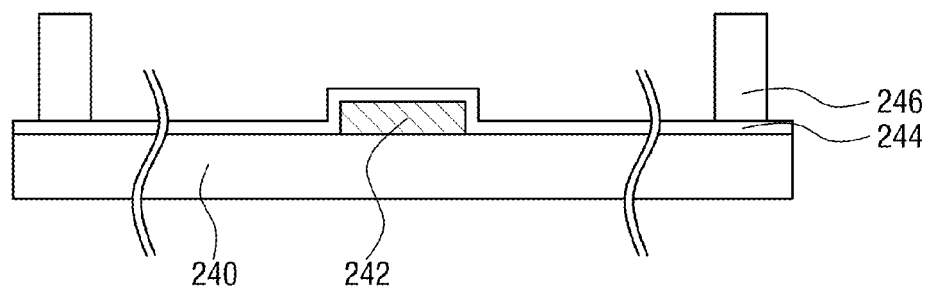
Figure 15D:
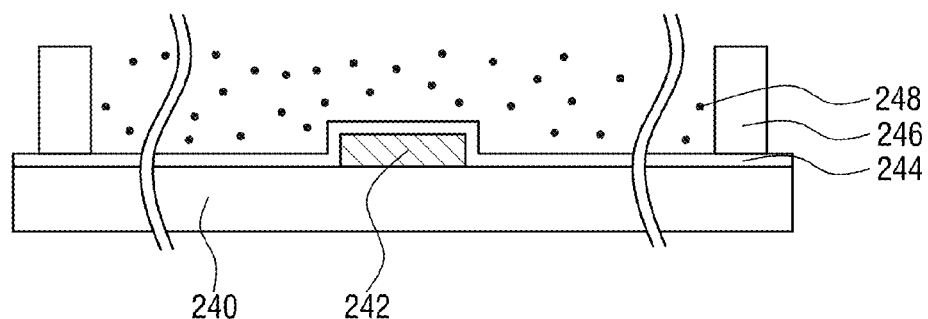

FIGS. 15a-15c illustrate cross-sectional views of forming a patterned and insulated electrode on a lower substrate in a divided region according to an exemplary embodiment of the invention. As shown in FIG. 15a, a metal electrode 242 is formed in a divided region on the substrate 240 by patterning a metal layer. As shown in FIG. 15b, an insulating layer 244 is provided over both the substrate 240 and the metal electrode 242. The insulating layer 244 can be one of silicon oxide and silicon nitride. As shown in FIG. 15c, partitions 246 are then formed on the insulating layer 244. As shown in FIG. 15d, the metal electrode 242 is insulated with the insulating layer 244 to maintain a separation between the metal electrode 242 and the pigment particles 248. The insulating layer 244 prevents the pigment particles 248 from adhering to the metal electrode 242.

Figure 16A:
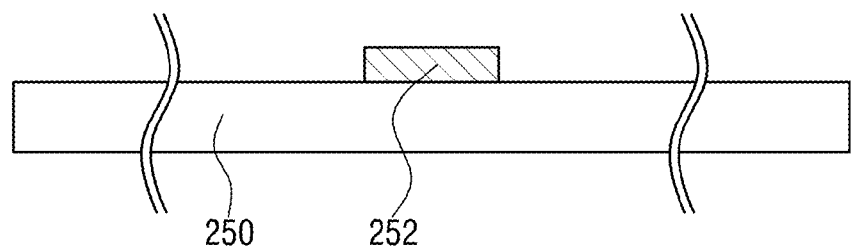
FIGS. 16a-16d illustrate cross-sectional views of forming a patterned electrode in a bedding layer on a lower substrate in a divided region according to an exemplary embodiment of the invention.
Figure 16B:
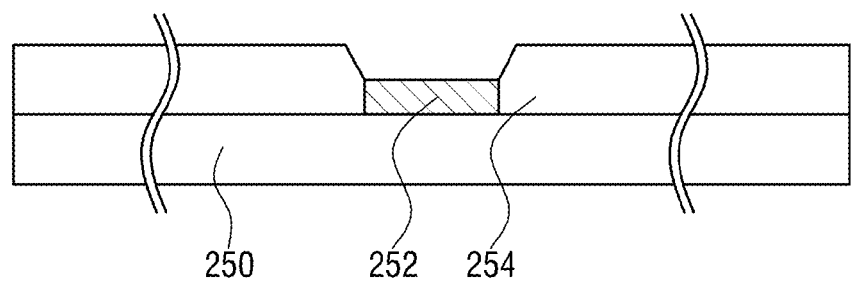
Figure 16C:
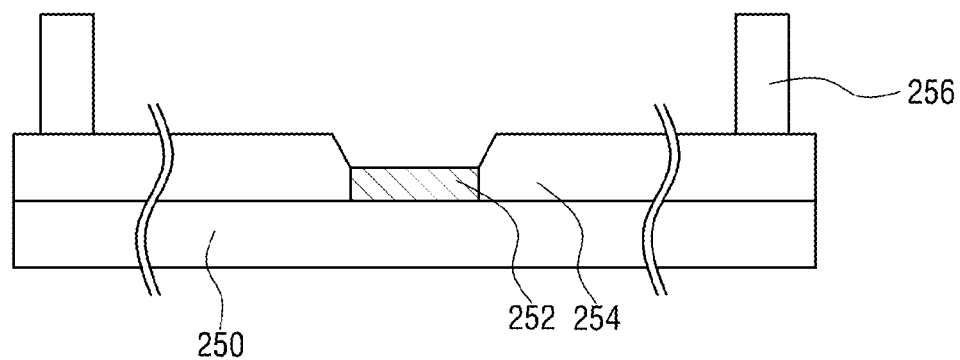
Figure 16D:
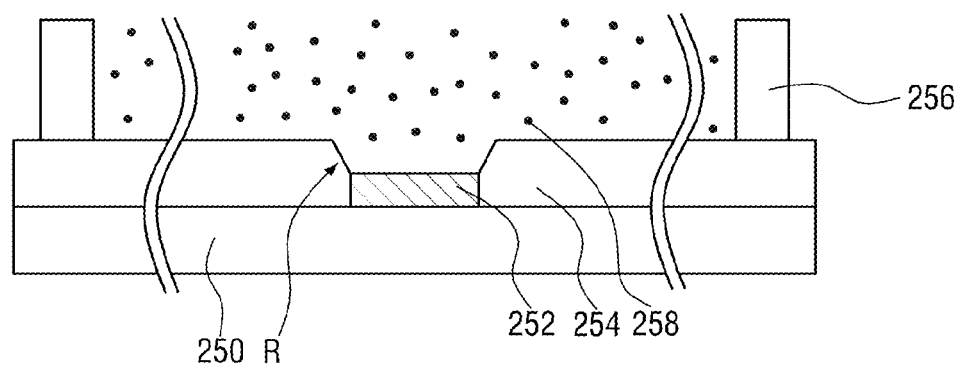

FIGS. 16a-16d illustrate cross-sectional views of forming a patterned electrode in a bedding layer on a lower substrate in a divided region according to an exemplary embodiment of the invention. As shown in FIG. 16a, a metal electrode 252 is formed in a divided region on the substrate 250 by patterning a metal layer. As shown in FIG. 16b, a bedding layer 254 is provided over the substrate 250 but not the metal electrode 252. The bedding layer can be formed by first providing an organic insulating layer over both the metal electrode 252 and the substrate 250. The organic insulating layer can be one of photoresist, BCB, and photoacrylic. Then, the organic insulating layer is then formed by patterning, which can include the use of a photolithography process. As shown in FIG. 16c, partitions 256 are then formed on the bedding layer 254. As shown in FIG. 16d, the bedding layer 254 creates a reservoir R over the metal electrode 252. The pigment particles 258 collect in the reservoir R when the metal electrode 252 is at opposite polarity than the pigment particles 258.

Figure 17A:
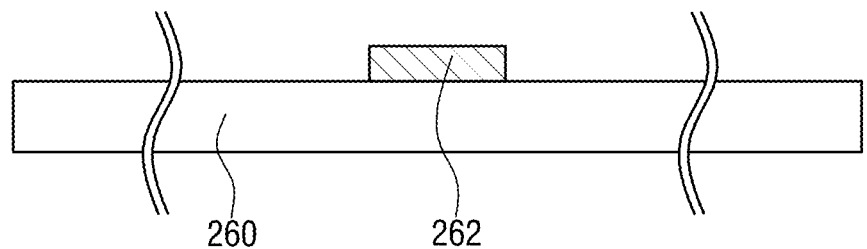
FIGS. 17a-17d illustrate cross-sectional views of forming an insulating layer over a patterned electrode in a bedding layer on a lower substrate in a divided region according to an exemplary embodiment of the invention.
Figure 17B:
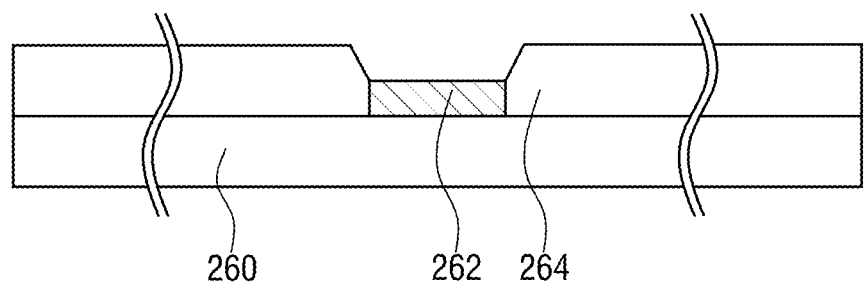
Figure 17C:
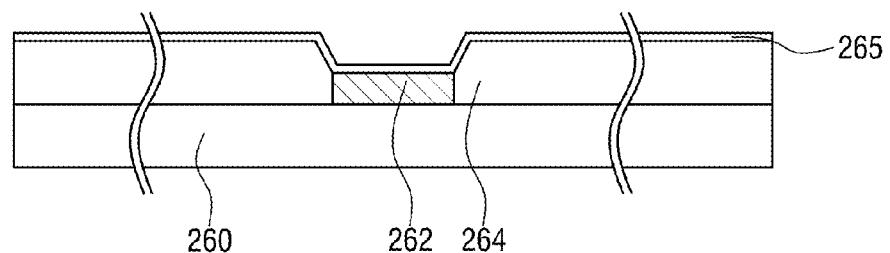
Figure 17D:
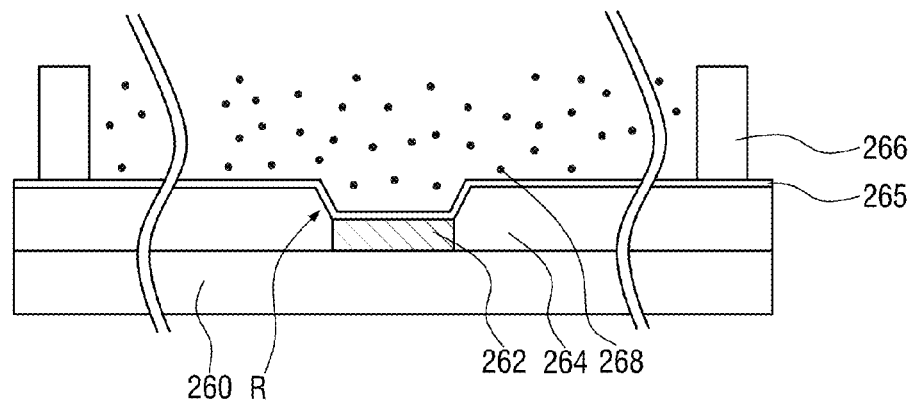

FIGS. 17a-17d illustrate cross-sectional views of forming an insulating layer over a patterned electrode in a bedding layer on a lower substrate in a divided region according to an exemplary embodiment of the invention. As shown in FIG. 17a, a metal electrode 262 is formed in a divided region on the substrate 260 by patterning a metal layer. As shown in FIG. 17b, a bedding layer 264 is provided over the substrate 260 but not the metal electrode 262. As shown in FIG. 17c, an insulating layer 265 is provided over both the bedding layer 264 and the metal electrode 262. As shown in FIG. 17d, partitions 266 are then formed on the insulating layer 265. The insulating layer 265 maintains a separation between the metal electrode 262 and the pigment particles 268 and prevents the pigment particles 268 from adhering to the metal electrode 262. The bedding layer 264 creates a reservoir R over the metal electrode 262.

Figure 18A:
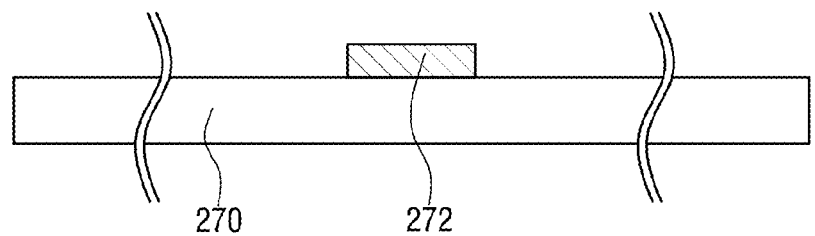
FIGS. 18a-18d illustrate cross-sectional views of an insulated patterned electrode in a bedding layer on a lower substrate in a divided region according to an exemplary embodiment of the invention.
Figure 18B:
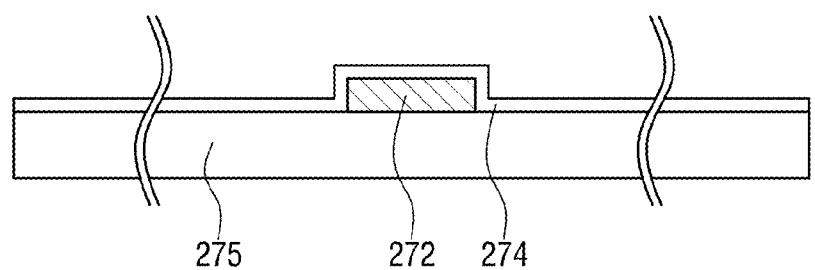
Figure 18C:
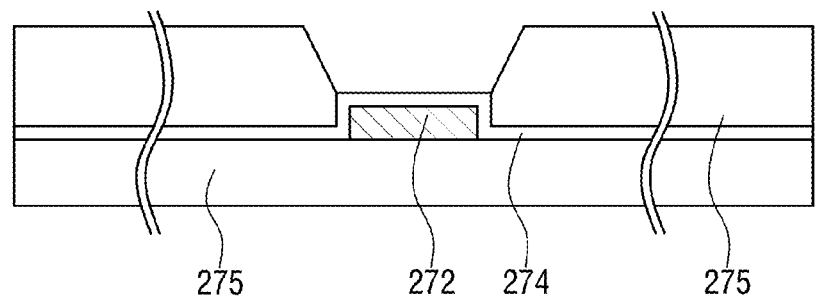
Figure 18D:
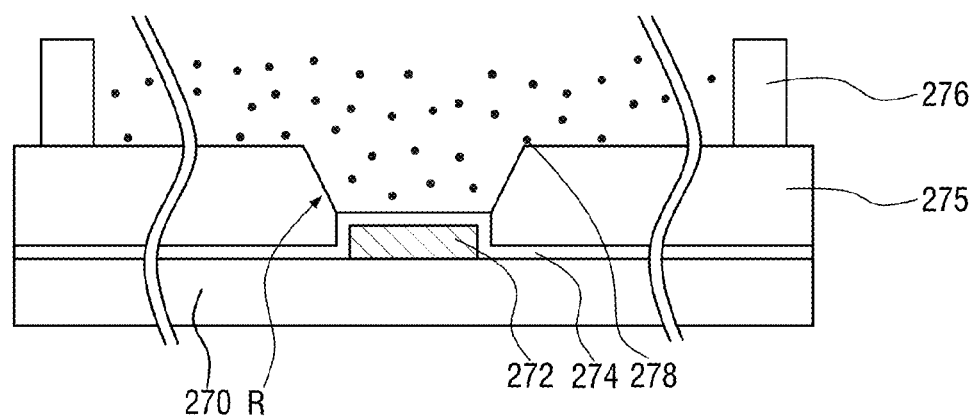

FIGS. 18a-18d illustrate cross-sectional views of an insulated patterned electrode in a bedding layer on a lower substrate in a divided region according to an exemplary embodiment of the invention. As shown in FIG. 18a, a metal electrode 272 is formed in a divided region on the substrate 270 by patterning a metal layer. As shown in FIG. 18b, an insulating layer 274 is provided over both the substrate 270 and the metal electrode 272. As shown in FIG. 18c, a bedding layer 275 is provided over the insulating layer 274 directly on the substrate 270 but not on insulating layer 274 above the metal electrode 270. The insulating layer 275 maintains a separation between the metal electrode 272 and the pigment particles 278 and prevents the pigment particles 278 from adhering to the metal electrode 272. The bedding layer 274 creates a reservoir R over the metal electrode 272.

Figure 19A:
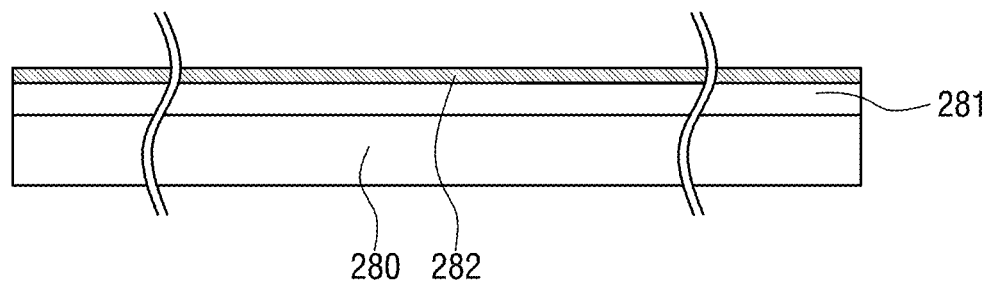
FIGS. 19a-19c illustrates forming a metal electrode over an uneven insulating layer on a lower substrate in a divided region according to an exemplary embodiment of the invention.
Figure 19B:
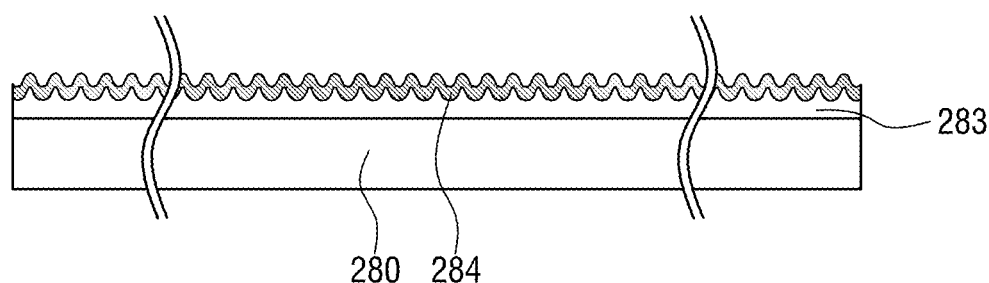
Figure 19C:
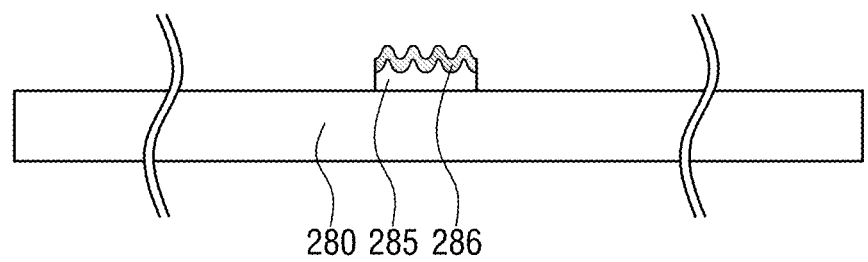

FIGS. 19a-19c illustrates forming a metal electrode with an uneven surface on a lower substrate in a divided region according to an exemplary embodiment of the invention. As shown in FIG. 19a, a polymer layer 281 is deposited onto a transparent substrate 280. Then, a metal layer 282 is deposited onto the polymer layer 281 like organic insulating polymer, it is organic material As shown in FIG. 19b, the metal layer 282 covered polymer layer 281 is subjected to a thermal treatment such polymer layer 283 buckles to make the metal layer 284 have an uneven surface. As shown in FIG. 19c, the polymer layer and the metal layer with an uneven surface can be patterned into uneven polymer pattern 285 and a metal electrode 286 by using a mask.

The uneven surface of the metal electrode 286 over an uneven polymer pattern 285 increases the efficiency of the electrode in collecting pigment particles when the electrode is at a polarity opposite to the charge of the pigment particle. More specifically, the pigment particles collect more evenly across the top of the metal electrode 285 over an uneven insulating layer. Accordingly, all of the electrodes tend to have the same performance at the same operating voltages.

A metal electrode 285 over an uneven insulating layer can be implemented in all of the previously disclosed embodiments for electrodes on a lower substrate. For example, the metal electrode 285 over an uneven insulating layer can be implemented as the electrode in the embodiment of divided regions shown in FIGS. 4a and 4b. Further, the metal electrode 285 over an uneven insulating layer can be implemented as an insulated electrode in the embodiment of divided regions shown in FIGS. 15a-15c. Further, the metal electrode 285 over an uneven insulating layer can be implemented in a bedding layer like the embodiment of divided regions shown in FIGS. 16a-16c. Furthermore, the metal electrode 285 can be implemented in a bedding layer along with an insulating layer in the embodiments of divided regions shown in FIGS. 17a-17c and in FIGS. 18a-18c.

Figure 20A:
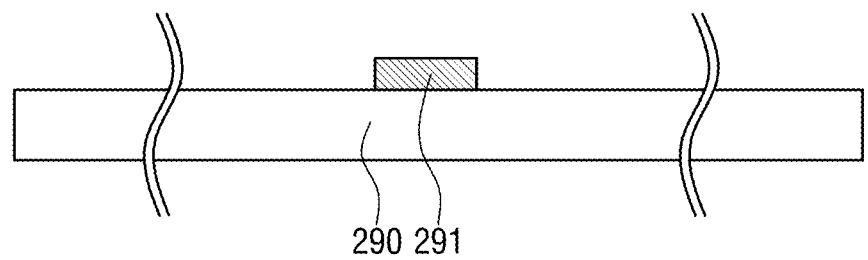
FIGS. 20a and 20b illustrates forming an etched electrode with an uneven surface on a lower substrate in a divided region according to an exemplary embodiment of the invention.
Figure 20B:
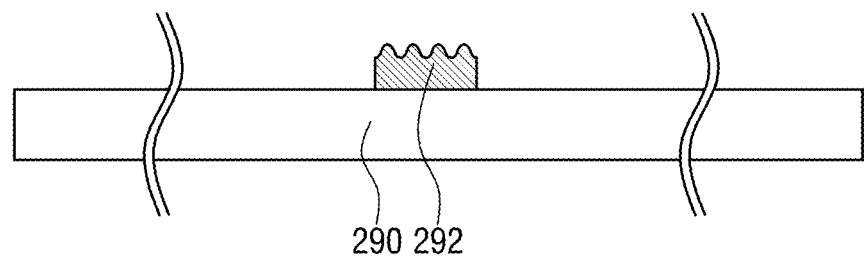

FIGS. 20a and 20b illustrates forming an etched electrode with an uneven surface on a lower substrate in a divided region according to an exemplary embodiment of the invention. As shown in FIG. 20a, a metal 291 is deposited onto one of a transparent substrate 290. As shown in FIG. 20b, the metal layer 291 is etched to have an uneven surface and then patterned to form a patterned electrode with an etched uneven surface 292.

A patterned electrode with an etched uneven surface 292 can be implemented in all of the previously disclosed embodiments for electrodes on a lower substrate. For example, the etched electrode with an uneven surface 292 can be implemented as the electrode in the embodiment of divided regions shown in FIGS. 4a and 4b. Further, the etched electrode with an uneven surface 292 can be implemented as an insulated electrode like the embodiment of divided regions shown in FIGS. 15a-15c. Further, the etched electrode with an uneven surface 292 can be implemented in a bedding layer like the embodiment of divided regions shown in FIGS. 16a-16c. Furthermore, the etched electrode with an uneven surface 292 can be implemented in a bedding layer along with an insulating layer like the embodiments of divided regions shown in FIGS. 17a-17d and in FIGS. 18a-18d.

Figure 21A:
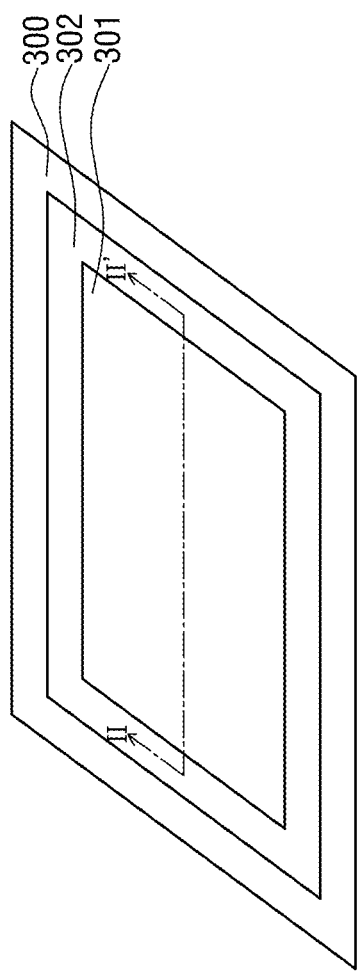
FIGS. 21a and 21b respectively illustrate a perspective view and a side view along III-III' of a patterned and insulated planar electrode on an upper substrate according to an exemplary embodiment of the invention.
Figure 21B:
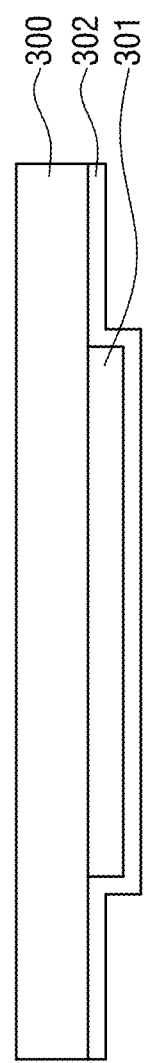

FIGS. 21a and 21b respectively illustrate a perspective view and a side view along III-III' of a formed and insulated planar electrode on an upper substrate according to an exemplary embodiment of the invention. The planar electrode 301 is formed on a transparent upper substrate 300 made of glass or a polymer. An insulating layer 302 is formed onto the planar electrode 301. In that alternative, the insulating layer 302 can be omitted, such as in single voltage applications.

FIGS. 22a and 22b respectively illustrate a perspective view and a side view along IV-IV' of patterned column electrodes on an upper substrate according to an exemplary embodiment of the invention. Columns electrodes 311 are patterned on a transparent upper substrate 310 made of glass or a polymer. An insulating layer 310 is formed onto the column electrode 311. In that alternative, the insulating layer 312 can be omitted, such as in single voltage applications.

Figure 23A:
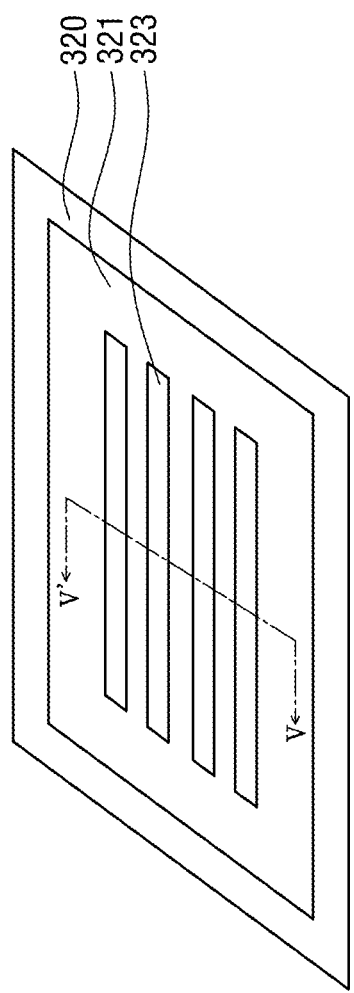
FIGS. 23a and 23b respectively illustrate a perspective view and a side view along V-V' of a planar electrode insulated from patterned and insulated row electrodes on an upper substrate according to an exemplary embodiment of the invention.
Figure 23B:
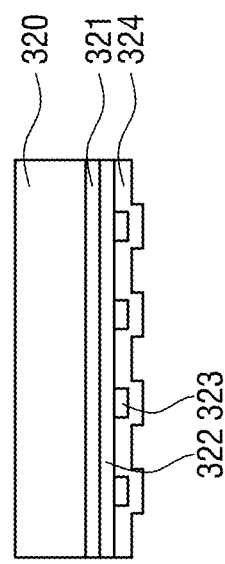

FIGS. 23a and 23b respectively illustrate a perspective view and a side view along V-V' of a planar electrode insulated from formed and insulated row electrodes on an upper substrate according to an exemplary embodiment of the invention. A planar electrode 321 is formed on a transparent upper substrate 320 made of glass or a polymer. A first insulating layer 322 is provided over the planar electrode 321. Row electrodes 323 are patterned onto the intermediary insulating layer 322. A second insulating layer 324 is deposited onto the row electrodes 323 and the intermediary insulating layer 322. The first and second insulating layers 321 324 may be formed within seal line on the transparent upper substrate 320. Also the first insulating layer may be the same size as the second insulating layer.

Figure 24:
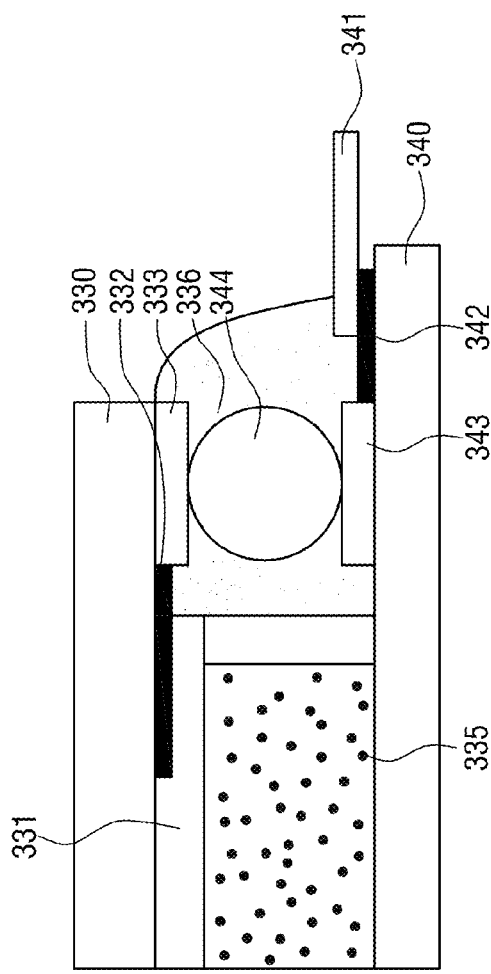
FIG. 24 illustrates a contact structure to the upper electrode of the upper substrate through the cured seal line according to an exemplary embodiment of the invention.

FIG. 24 illustrates a contact structure to the upper electrode of the upper substrate through the cured seal line according to an exemplary embodiment of the invention. As shown in FIG. 24, the upper electrode 331 connects to an upper conductive line 332 on the upper substrate 330. The upper conductive line 332 contacts to a conductive pad 333 on the upper substrate 330. A circuit element 341 connects to a lower conductive line 342 on the lower substrate 340. The lower conductive line 342 contacts to a lower conductive pad 343 on the lower substrate 340. A conductive ball 344 within the cured seal line 336 contacts to both the upper conductive pad 333 and the lower conductive pad 343 during the applying of a vacuum to remove air in the chamber. Later, the conductive ball 344 is immobilized between the upper conductive pad 333 and the lower conductive pad 343 during the curing of the sealing line.

Figure 25:
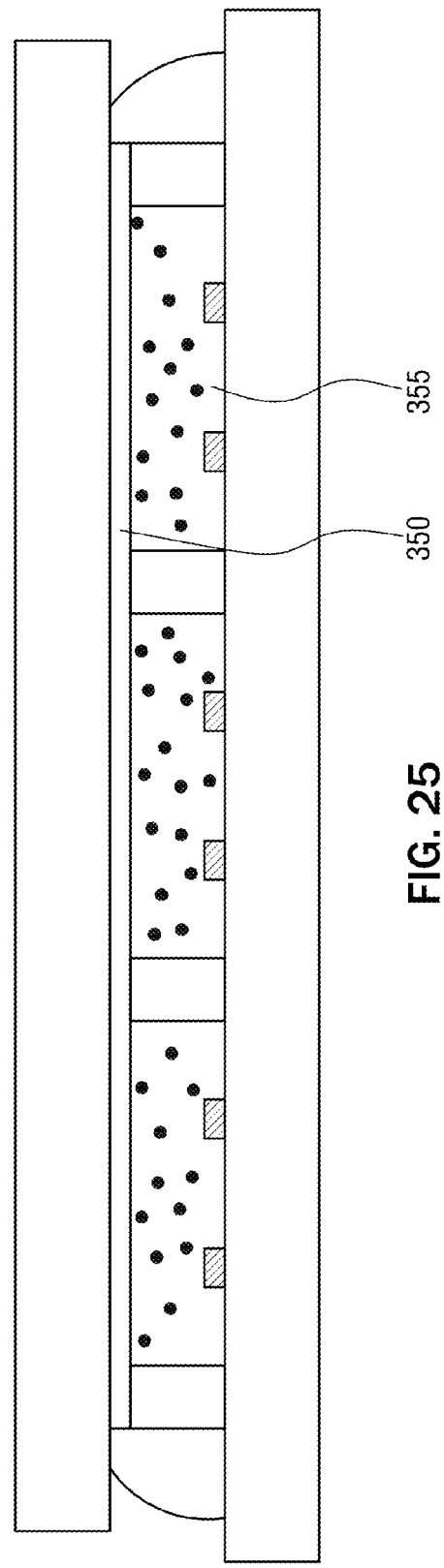
FIG. 25 illustrates a cross-sectional view of an optical shutter using a non-insulated upper electrode according to an exemplary embodiment of the invention.
Figure 26:
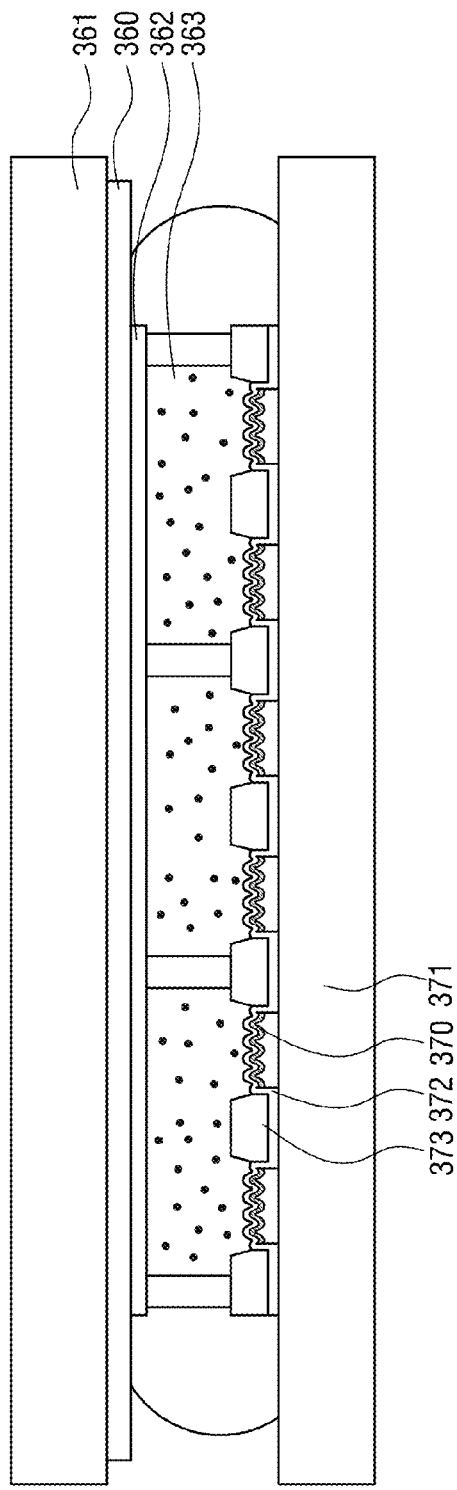
FIG. 26 illustrates a cross-sectional view of an optical shutter using an insulated upper electrode an insulated patterned electrode in a bedding layer according to an exemplary embodiment of the invention.

FIG. 25 illustrates a cross-sectional view of an optical shutter using a non-insulated upper electrode according to an exemplary embodiment of the invention. As shown in FIG. 25, the upper electrode 350 contacts with the partitions of the divided regions and the electrophoretic fluid 355 are formed between the upper and the lower electrodes. FIG. 26 illustrates a cross-sectional view of an optical shutter using an insulated upper electrode an insulated patterned electrode in a bedding layer according to an exemplary embodiment of the invention. As shown in FIG. 26, the upper electrode 360 on the upper substrate 361 is insulated from the electrophoretic fluid 363 by an insulation layer 362. The insulated upper electrode 360 is the same upper electrode for all of the divided regions. Each of the metal electrodes 370 of the lower substrate 371 are covered by an insulating layer 372, which is covered by a bedding layer 373. The upper electrode 360 is the same upper electrode for all of the divided regions.

Figure 27:
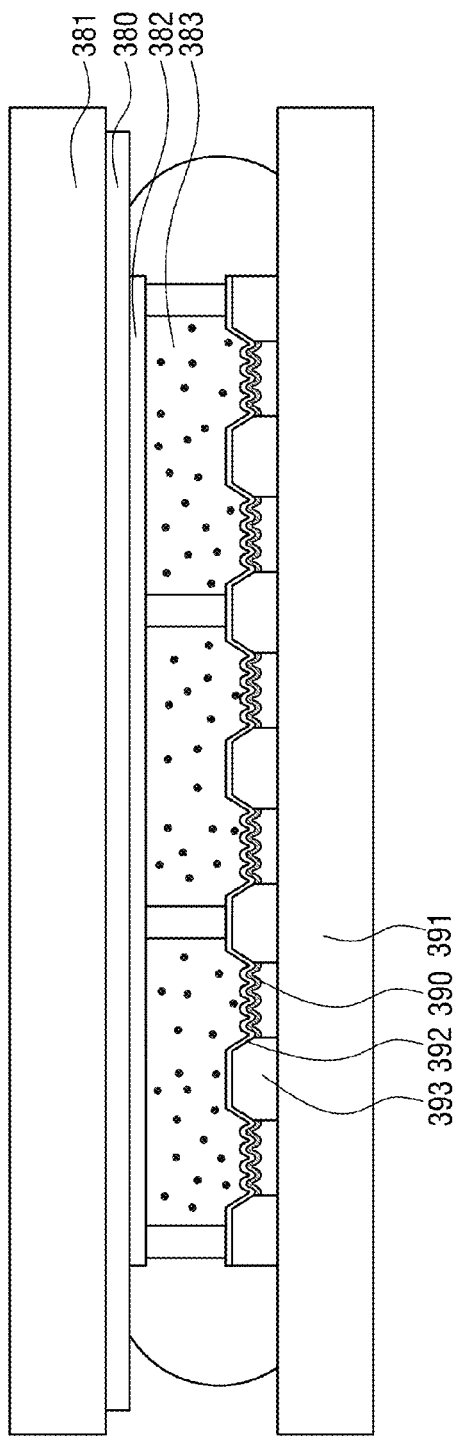
FIG. 27 illustrates a cross-sectional view of an optical shutter using an insulating layer over a patterned electrode in a bedding layer according to an exemplary embodiment of the invention.

FIG. 27 illustrates a cross-sectional view of an optical shutter using an insulating layer over a patterned electrode in a bedding layer according to an exemplary embodiment of the invention. As shown in FIG. 27, the upper electrode 380 on the upper substrate 381 is insulated from the electrophoretic fluid 383 by an insulation layer 382. The insulated upper electrode 380 is the same upper electrode for all of the divided regions. Each of the metal electrodes 390 of the lower substrate 391 are in bedding layers 393. An insulating layer 392 covers both the bedding layers 393 and the metal electrodes 390. The upper electrode 360 is the same upper electrode for all of the divided regions.

To drive the optical shutter, the upper electrode 380 and metal electrodes 390 may receive a negative voltage and positive voltage, respectively. In the alternative, the upper electrode 380 on the upper substrate 381 may receive a positive voltage while the metal electrodes 390 on the lower substrate receive a reference voltage, 0V, or is left in a floating or ground state. In the event that a positive voltage is applied on the upper electrode 380, the pigment particle charged with a negative charge move to the upper electrode 380. Each of the electrodes can be connected to a voltage control element through electrical wiring for applying voltages to the upper electrode 380 and the metal electrodes 390.

Depending on the voltage applied on the upper electrode 380 and metal electrodes 390, the pigment particles 383 can migrate toward the upper substrate 381 and be dispersed across the upper electrode 380 along the insulation layer 382 on the upper substrate 381. Incident light upon the optical shutter can pass through the upper substrate 381, the upper electrode 380 and the insulation layer 382 but the light is absorbed by the pigment particles. Such an arrangement of pigment particles 383 enables the color black to be visible at the optical shutter's upper area. Blocking light with such an arrangement of the pigment particles 383 using the applied voltage puts the optical shutter into a condition called the closed mode (or light blocking mode or closed light valve mode).

The incident light through the lower substrate 391 can also be blocked. For example, in the event that light is incident through the lower substrate, the incident light penetrates the lower substrate and bedding layers 393 and arrives at the pigment particles 383 to be absorbed by the pigment particles. Accordingly, in the closed mode (or light blocking mode or closed light valve mode), the color black can be visible at the optical shutter's lower area.

A positive voltage may be applied on the metal electrodes 390 formed on the lower substrate 391 while a reference voltage, 0V, may be applied to the upper electrode 380 or the upper electrode 380 may be in a ground or floating state. Due to these voltages being applied on the metal layers 390 and the upper electrode 380, pigment particles move to the lower substrate 391 and are located near the opening of the bedding layers 393 on the metal layers 390 on the lower substrate 391. Incident light penetrates through the optical shutter from the lower side to the upper side such that the light is visible at the optical shutter's upper area. By arranging the pigment particles 383 with the applied voltages as stated above, the optical shutter's condition is in a see through mode or transparent mode.

In embodiments of the invention, the transmissivity of the optical shutter is increased by the metal layers 390 having a surface roughness, unevenness or the irregularities in the metal's surface. During the transparent mode, a voltage is applied on the metal layers to form an electric field. The pigment particles 383 accumulated within the depressions of the uneven metal surface. Thus, pigment particles 383 are able to be collected while the metal layers 390 continue to effectively emit an electric field from the highpoints of the uneven metal surface to attract even more pigment particles 383. Accordingly, through the creation of multiple roughness on the upper metal layers 390, transmissivity can be raised in the transparent mode by effectively collecting pigment particles 383.

It will be apparent to those skilled in the art that various modifications and variations can be made in the embodiments of the invention without departing from the spirit or scope of the invention. Thus, it is intended that embodiments of the invention cover the modifications and variations of this invention provided they come within the scope of the appended claims and their equivalents.

What is claimed is:

1. An optical controller, comprising:
   a transparent lower substrate with a first electrode pattern;
   a polymer pattern between the transparent lower substrate and the first electrode pattern;
   a transparent upper substrate with a transparent electrode;
   a plurality of divided regions separated by partitions on the transparent lower substrate;
   a medium containing charged particles at less than 5 wt % within the plurality of divided regions and between the first electrode pattern and the transparent electrode; and
   a seal surrounding the plurality of divided regions and bonded to the transparent lower substrate and the transparent upper substrates.

2. The optical controller according to claim 1, further comprising a first insulating layer on the first electrode pattern and a second insulating layer on the transparent electrode.

3. The optical controller according to claim 1, wherein the medium has a viscosity of less than 50 cp.

4. The optical controller according to claim 1, wherein the partitions of the plurality of divided regions are in one of a column, row and matrix configuration.

5. The optical controller according to claim 1, wherein the partitions of the divided regions are attached to the transparent lower substrate and extend toward the upper substrate to prevent shifting of the medium between the divided regions.

6. The optical controller of claim 1, wherein a distance between opposing partitions of a divided region is more than 200 micrometers.

7. The optical controller according to claim 1, wherein the polymer and the first electrode pattern have an uneven surface.

8. The optical controller according to claim 1, wherein the first electrode pattern corresponds to the polymer pattern.

9. The optical controller according to claim 1, further comprising a first insulating layer on the first electrode pattern.

10. The optical controller according to claim 9, further comprising a second insulating layer on the transparent electrode.

11. The optical controller according to claim 1, wherein the transparent electrode has an open region.

12. The optical controller according to claim 11, wherein the first electrode pattern is positioned to correspond to the open region of the transparent electrode such that the transparent electrode has a staggered arrangement with respect to the first electrode pattern.

13. An optical controller, comprising:
    a lower substrate with a first electrode pattern;
    a polymer pattern between the lower substrate and the first electrode pattern;
    an upper substrate with a second electrode pattern;
    a plurality of divided regions separated by partitions on the lower substrate; and
    a medium positioned within the seal structure and between the first electrode pattern and
    the second electrode pattern, the medium having a vapor pressure of less than 40 Pa and containing charged particles of substantially a first polarity.

14. The optical controller according to claim 13, further comprising a first insulating layer on the first electrode pattern and a second insulating layer on the second electrode pattern.

15. The optical controller according to claim 13, wherein the medium contains charged particles at less than 5 wt %.

16. The optical controller according to claim 13, further comprising a seal surrounding the plurality of divided regions.

17. The optical controller according to claim 16, wherein the seal is cured using ultraviolet light.

18. The optical controller according to claim 13, wherein the partitions of the plurality of divided regions are in one of a column, row and matrix configuration.

19. The optical controller according to claim 13, wherein the partitions of the divided regions are attached to the transparent lower substrate and extend toward the upper substrate to prevent shifting of the medium between the divided regions.

20. The optical controller of claim 13, wherein a longest distance between adjacent partitions of a divided region is more than 200 micrometers.

21. The optical controller according to claim 13, wherein the polymer and the first electrode pattern have an uneven surface.

22. The optical controller according to claim 13, wherein the first electrode pattern corresponds to the polymer pattern.

23. The optical controller according to claim 13, further comprising a first insulating layer formed on the first electrode pattern.

24. The optical controller according to claim 23, further comprising a second insulating layer is formed on the second electrode pattern.

25. The optical controller according to claim 13, wherein the transparent electrode has an open region.

26. The optical controller according to claim 25, wherein the first electrode pattern is positioned to correspond to the open region of the transparent electrode such that the transparent electrode has a staggered arrangement with respect to the first electrode pattern.

27. A method of making an optical controller, comprising:
    forming a first electrode having a polymer pattern on a first substrate;
    forming a plurality of divided regions separated by partitions on the first substrate;
    dispensing an electrophoretic fluid on the first substrate in which the fluid contains charged particles at less than 5 wt %;

forming a second electrode on a second substrate;

positioning the second substrate on the first substrate in a chamber; and evacuating the chamber so that the first and second substrates are bonded to each other.

28. The method of making an optical controller according to claim 27, further comprising forming a seal structure on the second substrate prior to the positioning the second substrate.

29. The method of making an optical controller according to claim 27, further comprising curing the seal at atmospheric pressure after evacuating the chamber.

30. The method of making an optical controller according to claim 27, wherein a distance between opposing partitions of a divided region is more than 200 micrometers.

31. The method of making an optical controller according to claim 27, wherein the partitions of the plurality of divided regions are in one of a column, row and matrix configuration.

* * * * *